(12) United States Patent
Leone

(10) Patent No.: US 9,010,305 B2
(45) Date of Patent: Apr. 21, 2015

(54) OCTANE SEPARATION SYSTEM AND OPERATING METHOD

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/973,879

(22) Filed: Aug. 22, 2013

(65) Prior Publication Data

US 2015/0053189 A1 Feb. 26, 2015

(51) Int. Cl.
*F02M 43/00* (2006.01)
*F02D 19/06* (2006.01)

(52) U.S. Cl.
CPC ........ *F02D 19/0634* (2013.01); *F02D 19/0649* (2013.01); *F02M 43/00* (2013.01)

(58) Field of Classification Search
CPC ............ F02D 19/0634; F02D 19/0636; F02D 19/0649; F02M 43/00
USPC .............. 123/575–578, 304, 27 GE; 701/101, 701/103, 104, 107
See application file for complete search history.

(56) References Cited

U.S. PATENT DOCUMENTS

| | | | |
|---|---|---|---|
| 3,022,425 A * | 2/1962 | Rockstead | 290/40 R |
| 3,254,620 A | 6/1966 | Cannon | |
| 3,640,894 A | 2/1972 | Sampson | |
| 4,391,716 A | 7/1983 | McCurry | |
| 5,237,978 A | 8/1993 | Bailey | |
| 5,408,874 A | 4/1995 | Fleck, Sr. et al. | |
| 6,332,448 B1 * | 12/2001 | Ilyama et al. | 123/304 |
| 6,450,193 B1 | 9/2002 | Constantinou | |
| 6,622,663 B2 | 9/2003 | Weissman et al. | |
| 6,711,892 B2 | 3/2004 | Tamura et al. | |
| 6,711,893 B2 * | 3/2004 | Ueda et al. | 60/285 |
| 6,972,093 B2 * | 12/2005 | Partridge et al. | 210/321.6 |

(Continued)

FOREIGN PATENT DOCUMENTS

| | | |
|---|---|---|
| EP | 1443202 A2 | 8/2004 |
| JP | H05312115 A | 11/1993 |

(Continued)

OTHER PUBLICATIONS

Berkemeier, Oliver et al., "Direct-Injection Internal Combustion Engine with Outwardly Opening Injection Nozzle, and Method for Operating an Internal Combustion Engine of Said Type," U.S. Appl. No. 13/924,329, filed Jun. 21, 2013, 26 pages.

(Continued)

*Primary Examiner* — Lindsay Low
*Assistant Examiner* — Grant Moubry
(74) *Attorney, Agent, or Firm* — Julia Voutyras; Allerman Hall McCoy Russell & Tuttle LLP

(57) ABSTRACT

An engine method, comprising delivering fuel with an octane level above a threshold to a first fuel tank and delivering fuel with an octane level below a threshold to a second fuel tank; monitoring a staleness of fuel within first fuel tank and the second fuel tank; delivering fuel with an octane level above the threshold to an engine in response to the staleness of fuel of the first fuel tank; and delivering fuel with an octane level below the threshold to the engine in response the staleness of fuel of the second fuel tank.

14 Claims, 15 Drawing Sheets

(56) References Cited

U.S. PATENT DOCUMENTS

| | | |
|---|---|---|
| 7,263,967 B2 * | 9/2007 | Hotta et al. ............... 123/275 |
| 7,278,396 B2 | 10/2007 | Leone et al. |
| 7,287,492 B2 | 10/2007 | Leone et al. |
| 7,426,907 B2 | 9/2008 | Dearth et al. |
| 7,610,896 B2 * | 11/2009 | Kakuho et al. ............ 123/304 |
| 7,647,916 B2 | 1/2010 | Leone et al. |
| 7,845,315 B2 | 12/2010 | Leone et al. |
| 8,051,828 B2 * | 11/2011 | Sengupta et al. .......... 123/304 |
| 8,065,979 B2 | 11/2011 | Leone et al. |
| 8,118,009 B2 | 2/2012 | Pursifull et al. |
| 8,127,745 B2 | 3/2012 | Surnilla et al. |
| 8,141,356 B2 | 3/2012 | Leone et al. |
| 8,267,066 B2 | 9/2012 | Surnilla et al. |
| 8,267,074 B2 | 9/2012 | Leone et al. |
| 8,280,610 B2 | 10/2012 | Santoso et al. |
| 8,312,867 B2 | 11/2012 | Pursifull et al. |
| 8,353,269 B2 | 1/2013 | Kasseris et al. |
| 8,375,899 B2 | 2/2013 | Leone et al. |
| 8,387,591 B2 | 3/2013 | Surnilla et al. |
| 8,550,059 B2 | 10/2013 | Makarov et al. |
| 2004/0182378 A1 * | 9/2004 | Oshimi et al. ............. 123/685 |
| 2005/0056264 A1 * | 3/2005 | Weissman et al. ......... 123/577 |
| 2008/0006333 A1 | 1/2008 | Partridge et al. |
| 2009/0078239 A1 | 3/2009 | Hill et al. |
| 2009/0165759 A1 * | 7/2009 | Sengupta et al. .......... 123/575 |
| 2010/0229966 A1 | 9/2010 | Elwart et al. |
| 2013/0014731 A1 | 1/2013 | Pursifull et al. |
| 2013/0019593 A1 | 1/2013 | Jacques et al. |

FOREIGN PATENT DOCUMENTS

| | | |
|---|---|---|
| JP | 407019124 A | 1/1995 |
| JP | 02006257907 A | 9/2006 |
| SU | 731020 A1 | 4/1980 |
| SU | 848725 A1 | 7/1981 |
| WO | 03029624 A1 | 10/2003 |
| WO | 2008067623 A1 | 6/2008 |

OTHER PUBLICATIONS

Leone, Thomas G., "Octane Separation System and Operating Method," U.S. Appl. No. 13/973,886, filed Aug. 22, 2013, 80 pages.
Leone, Thomas G., "Octane Separation System and Operating Method," U.S. Appl. No. 13/973,872, filed Aug. 22, 2013, 80 pages.
Leone, Thomas G. et al., "Vapor Purging Octane Separation System," U.S. Appl. No. 14/019,362, filed Sep. 5, 2013, 40 pages.

* cited by examiner

OCTANE SEPARATION SYSTEM AND OPERATING METHOD

BACKGROUND AND SUMMARY

Gasoline used in engine combustion contains a large number of compounds, typically including dozens or hundreds of hydrocarbons plus alcohol. Each of these compounds may have different energy densities and knock properties or "octane" inherent to their chemical composition and structure.

The octane of a fuel is the ease at which the fuel auto-ignites. A fuel's octane may be classified by its tendency to ignite under variable pressure or temperature conditions. An octane rating is a standard procedure for quantifying the conditions at which a fuel auto-ignites without external ignition. Compounds with higher octane ratings may withstand greater temperature within a combustion chamber without auto-igniting. High torque demands may be met by increased airflow into a combustion chamber, thus a combustion chamber may have high pressure and temperature during high torque operation. If chamber conditions reach the auto-ignition conditions of the air-fuel mixture located therein, pre-ignition or engine knock may occur.

Hydrocarbon compounds having high octane ratings often have low energy density. In general, the combustion of an amount of high octane fuel will produce less energy than the combustion of the same amount of low octane fuel. Thus for a given energy demand, more high octane fuel is injected into a combustion chamber than low octane fuel. Thus the protective benefits of the high octane components of fuel are balanced with the fuel efficiency losses from combustion of fuels that are not energy dense.

Gasoline separation has been suggested as a means to address the above issues. Prior approaches have removed ethanol from blended fuel mixtures for selective injection. Ethanol however, is just one of the many high octane components of gasoline. Further, this method does not allow for a variable octane separation threshold.

Further approaches have separated the gasoline of an externally filled fuel tank into a low octane portion and a high octane portion stored separately in a high octane fuel tank and a low octane fuel tank. Many vehicles however have limited available space and therefore cannot accommodate a three fuel tank and three fuel pump configuration. Further, this method adds additional weight to the vehicle contributing to fuel efficiency losses, and the method is also high cost.

The inventors herein found that by separating fuel by octane level, the desired octane separation threshold may be set at a number of values to achieve precise combustion control. Further, by separating fuel into a high octane portion and a low octane portion and returning the low octane portion to the externally filled fuel tank (or vice versa) fuel separation advantages may be achieved without adding a third fuel pump and tank, lessening both the weight and space occupied by the separation system, and decreasing the system cost. A fuel separator may have a higher low octane output or a higher high octane output. Thus the separation tank may be smaller than the externally filled fuel tank and may store the fuel with an octane rate corresponding to lower separator output to further minimize the volume occupied by the separation system and the system weight and to effectively transform the externally filled fuel tank into a high octane fuel tank or a low octane fuel tank.

An exemplary embodiment may deliver fuel from an externally filled fuel tank to a separator where it may be separated into a low octane portion and a high octane portion. The high octane portion may be delivered to the high octane storage tank and the low octane portion may be returned to the externally filled fuel tank. The octane level within the externally filled fuel tank may continuously decrease throughout fuel separation and thus the octane level may be continuously monitored. An operating method may terminate fuel separation if the externally filled fuel tank's fuel level falls below a threshold or empties or if the smaller high octane fuel tank is full. Further embodiments may terminate separation if the octane level in the externally filled fuel tank falls below a threshold.

Prior fuel separation approaches experience fuel staleness after extended operation at a limited range of speed-loads. For example, this may result from a vehicle being used for heavy towing or operated at high power much more frequently than at lower power, thus low octane fuel may be used less frequently than high octane fuel. Alternatively, a vehicle may be operated almost exclusively at idle and light loads, thus high octane fuel may almost never be used. Therefore fuel in the underused tank may become stale after a period of time. Disclosed embodiments decrease or eliminate fuel staleness by independently monitoring conditions contributing to fuel staleness within the separate tanks. If fuel is determined to be stale, fuel from the underused tank may be delivered to the engine for combustion. Determination of fuel staleness may be desired for any engine system which stores and uses two fuels independently. For example, it may be desired for a dual fuel gasoline+CNG engine, for a gasoline PFI+E85 DI engine, for a system which uses onboard separation of ethanol from a gasoline-ethanol blend, etc.

The disclosed system is particularly well suited for systems equipped with secondary air injection for fast catalyst light-off and emission reduction. Exhaust gas enriched with an amount of low octane fuel may be more readily combustible than exhaust gas enriched with high octane fuel. Thus, when secondary air injection is desired low octane fuel may be used for increased secondary combustion efficiency.

In an exemplary embodiment, a system may have a high octane fuel tank and a low octane fuel tank and may be equipped with secondary air injection for exhaust combustion. When secondary air injection is desired an amount of low octane fuel delivered to the engine may increase. Similarly, if a high amount of low octane fuel is being used for combustion, secondary air injection may be initiated. Similar operation may also be used to increase efficiency and reduce emissions during engine cold start.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

DETAILED DESCRIPTION

Figure 1:
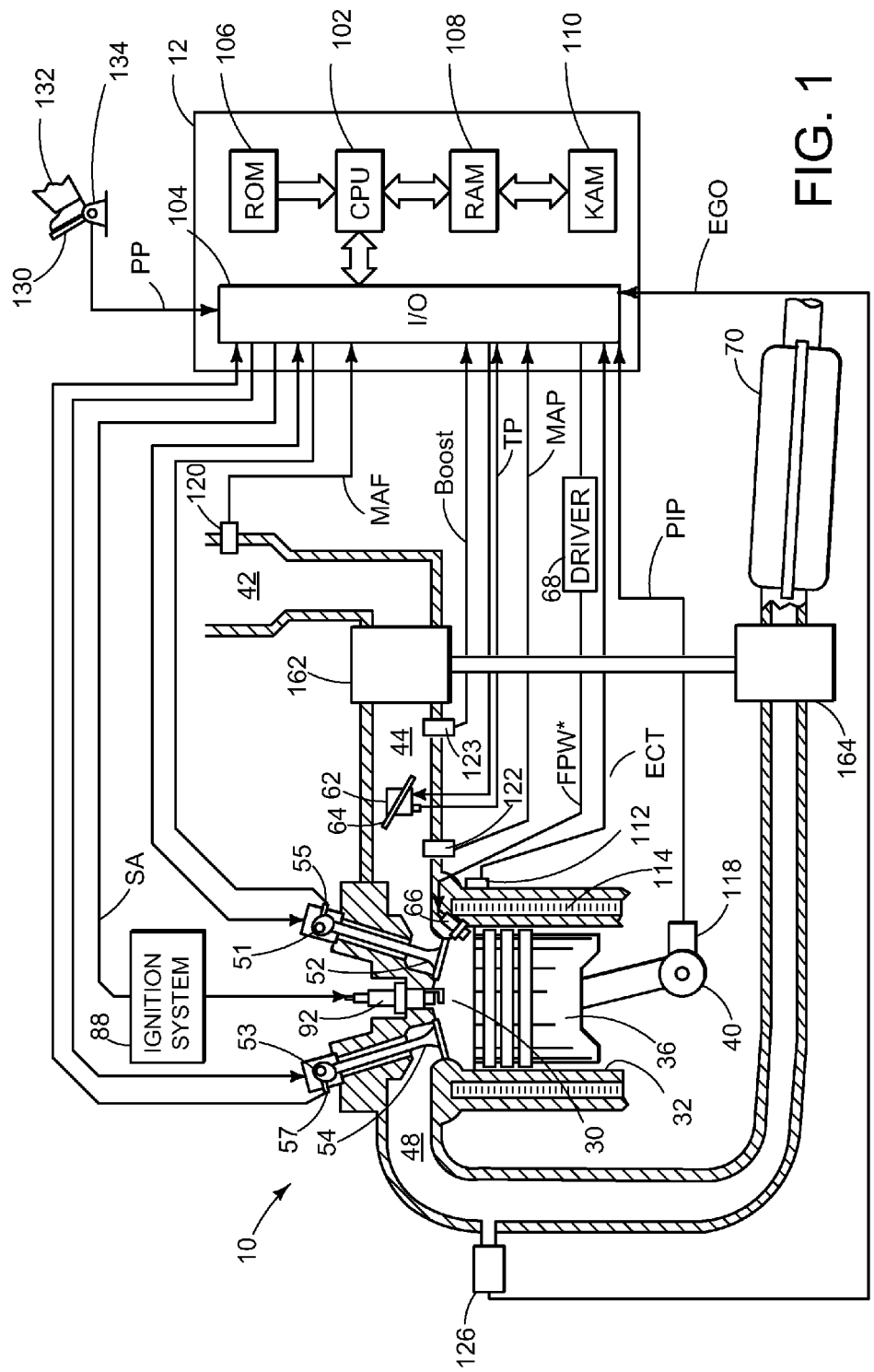
FIG. 1 depicts an example embodiment of a combustion engine.

Gasoline contains a large number of hydrocarbon compounds used for combustion. Compounds such as isooctane ($C_8H_{18}$), butane ($C_4H_{10}$), 3-ethyitoluene ($C_9H_{12}$), and octane enhancer methyl tert-butyl ether ($C_5H_{12}O$) are commonly found in gasoline, each having a respective octane rating and energy density. Ethanol ($C_2H_6O$) is also commonly found in blended gasoline and has a higher octane rating and lower energy density than unblended gasoline.

Octane rating and, synonymously, octane level refer to conditions that a fuel-air mixture can withstand without igniting. Higher octane fuels may withstand higher pressure and temperature within a combustion chamber without auto-igniting than lower octane fuels.

Under normal applied ignition conditions, combustion is initiated in a combustion chamber via a spark containing an air fuel mixture between 10 and 40 crankshaft degrees prior to top dead center. This allows for the combustion process to develop peak pressure at a time allowing for maximum recovery of work from the expanding gas. A flame front originating at the spark location accelerates through the air fuel mixture, rapidly increasing the pressure and temperature within the fuel-air mixture. Pressure then drops when the piston descends, and pressure energy is transformed into mechanical work and eventually engine torque.

During the high pressure portion of the piston cycle, the pressure and temperature within the cylinder may exceed the ignition threshold of the fuel-air mixture within the chamber. This may cause detonation within an air/fuel pocket outside of the flame front, called engine knocking. Engine knocking may cause objectionable noise, and severe or extended knock causes thermo-mechanical damage to the engine as well as a loss of fuel efficiency. The propensity for engine knocking may be decreased by lowering the heat of combustion or the pressure within the engine cylinders, however, this limits available torque. Pre-ignition occurs when the temperature or pressure within an engine cylinder causes the air-fuel mixture to ignite prior to ignition application.

Higher octane fuels are less likely to cause engine knocking or pre-ignition due to their heightened detonation threshold. Thus in conditions conducive to engine knock, such as high engine temperature or high aircharge pressure, high octane fuels may be desirable for injection into engine cylinders.

Energy density refers to the amount of energy a fuel releases during combustion. During combustion, thermal energy from the fuel may be transformed into piston work. Fuels with higher energy densities may expel more energy per unit mass or volume than fuels with lower energy densities. Thus a larger amount of low energy density fuel may be expended than high energy density fuel for a given torque output. Thus fuel with low energy density may contribute to fuel efficiency losses and heightened emissions.

An embodiment may optimize the advantages associated with both fuel types by selectively injecting high octane fuel during operation conducive to engine knock, and injecting low octane fuel for heightened efficiency.

In an embodiment, gasoline in an externally filled fuel tank may include a mixture of high octane and low octane compounds. An externally filled fuel tank may refer to the fuel tank coupled to the outside of the vehicle for direct delivery of fuel from a user by inserting a fuel nozzle into a fill neck. A fuel separator may be fluidically coupled to the externally filled fuel tank via a fuel pump located within a fuel delivery line. A fuel separator embodiment may include a containment vessel with a membrane located therein separating the containment vessel into a high octane portion and a low octane portion. Each portion may have a respective fuel outlet. A membrane may allow the selective permeation of some of the components contained within gasoline. Each of the two sides of the containment vessel may be maintained at respective pressures.

A side of the vessel coupled to the externally filled fuel tank may be maintained at a pressure higher than its opposite side. The high pressure side receiving fuel from the externally filled fuel tank may correspond with the low octane fuel side of the separator. Higher octane compounds may permeate through the membrane to the lower pressure side of the separator in a vaporous form.

The pressure within the high pressure side of the separator may be above a vapor pressure of high octane gasoline components and below a vapor pressure of low octane gasoline components. The octane level of gasoline's compounds may be proportional to the vapor pressure of the compounds. In other words, at a separator pressure, higher octane compounds may vaporize at a greater rate than low octane compounds creating a more high octane fuel and a more low octane fuel within a separator.

In an embodiment, fuel vapor on the low pressure side of the membrane may be collected in a secondary containment vessel where it may be condensed to a liquid state. For the reasons stated above, the octane level of condensed vapor may be higher than the octane level of the fuel remaining in the higher pressure side of the separator as well as the average octane level of the gasoline remaining in the externally filled fuel tank.

The rate at which gasoline vaporizes may be determined by the pressure at which the high and low pressure portions of the separator are maintained. It may also be proportional to an amount of time gasoline remains in the separator or the rate at which fuel is cycled through the separator. Thus in an embodiment, the high pressure side may be at a pressure such that the liquid volume of fuel permeated through the membrane is greater than the liquid volume of fuel remaining in the high pressure side or vice versa.

In an embodiment, high octane fuel may be stored in a high octane fuel tank and low octane fuel may be stored in a low octane fuel tank. Each tank may be coupled to the high octane portion of the fuel separator and the low octane portion of the fuel separator respectively. One or more fuel pumps may be operatively located between an externally filled fuel tank and the fuel separator, between the fuel separator and the high octane fuel tank, and between the fuel separator and the low octane fuel tank. Fuel pumps may accelerate fuel between the tanks and the separator.

In alternate embodiments, either the high octane port of the fuel separator or the low octane port of the fuel separator may be coupled to an inlet port of the externally filled fuel tank via a return line. In this embodiment, one of the additional separation tanks and respective pumps is eliminated, reducing the required packaging space and vehicle weight in comparison to the aforementioned embodiment. Consequentially, following a fuel refill event, the octane level in the externally filled fuel tank becomes increasingly higher or lower such that, after a time, the externally filled fuel tank becomes a high octane or low octane fuel tank.

In an embodiment, the high octane fuel tank and the low octane fuel tank may be separately coupled to the engine. The high and low octane fuel tank may have respective fuel lines fluidically coupled to a number of fuel injectors. In a dual direct injection embodiment, each cylinder may have a low octane fuel injector and a high octane fuel injector located on the periphery of each engine cylinder for injecting fuel directly into a combustion chamber.

In a still further embodiment, fuel lines may combine upstream of the fuel injectors. A valve may couple the high octane fuel line and the low octane fuel line to a combined fuel line. The valve may be actuated to select the octane level of fuel injected into the engine via a single set of fuel injectors.

Further embodiments may utilize port injection. In a port injection system one or more injectors at an intake port may inject fuel into intake air upstream of the engine cylinder. Some embodiments may have separate high octane and low octane injectors fluidically coupled to the high octane and low octane fuel tank respectively. Further embodiments may couple the high octane and low octane fuel lines upstream of the port fuel injectors.

Still further embodiments may have both port and direct injectors. In some embodiments, a port injector and a direct injector may both be fluidically coupled to a combined fuel line receiving relative amounts of high octane and low octane fuel. Embodiments may include a high octane port fuel injector, a low octane port fuel injector, a high octane direct injector, a low octane direct injector or some combination thereof. For example, a high octane injector may be coupled to each engine cylinder directly for increased knock suppression. A low octane injector may be a port injector to achieve improved air fuel mixing and part load pumping work.

Delivery of fuel to an injector via a fuel line and/or the activation of an injector may be controlled by a control system in response to operating conditions in embodiments. Operating tendencies of a driver may result in a disproportionate injection of high octane and low octane fuel. For example, a vehicle regularly operated at low engine speeds and gentle acceleration may rarely push the engine into higher engine loads, and may consequently rarely use high octane fuel. For this reason, high octane fuel within the high octane fuel tank may not be used regularly and may become stale. In another example, a vehicle operated regularly at high engine loads and high engine speeds, this may result in high octane fuel being injected into the engine more frequently than low octane fuel and low octane fuel may become stale.

Fuel staleness may refer to a number of fuel conditions that may result from fuel remaining in a fuel tank for an extended period of time. The shelf life of fuel is limited for a number of reasons. Staleness may include evaporation staleness, oxidation staleness, condensation staleness, and/or seasonal staleness. For example, the more volatile components of fuel may evaporate out of the fuel into the air within the fuel storage container, and be captured by the evaporative emissions system. This leads to degraded fuel evaporation and mixing, which may result in degraded engine starts and increased emissions. Hydrocarbons within fuel may also oxidize if left to sit in a fuel tank. Oxidation reduces fuel efficiency and may cause gasoline to congeal. Congealed gasoline may clog fuel filters and injectors leading to increased fuel degradation and decreased performance. Diurnal cycles may also cause humid air to contaminate the fuel system due to temperature fluctuations causing humidity in air to condense which, in turn, may cause freezing and dilution of fuel, and rust and corrosion within the fuel system.

For the purposes of this disclosure, fuel staleness may also refer to fuel having an inappropriate seasonal grade. Federal emissions regulations mandate the reformulation of gasoline fuel sold at pumps to reduce the content of toxic and ozone-forming compounds in vehicle emissions. For example, to reduce the emission of volatile organic compounds (VOC), fuels sold in southern areas (e.g., areas categorized under ASTM class B) may be required to have a lower Reid vapor pressure (RVP) as compared to fuels sold in northern areas (e.g., areas categorized under ASTM class C) during summer months. Specifically, the differences in climate between the two types of areas may require a corresponding difference in the gasoline fuel volatility to achieve the same emissions effect.

Other fuel parameters and fuel additives that affect vehicle emissions include the Reid vapor pressure (RVP) of the fuel, fuel oxygen, benzene and aromatics content, as well as the presence of sulfur, T90 (or E300), olefins, and T50 (or E200). To control the emissions of volatile organic compounds (VOC), fuel RVP and oxygen specifications have been mandated by the EPA. For example, fuels sold during high ozone (or summer) seasons (that is, from June 1 through September 15), are required to have an RVP of no more than 7.2 psi in southern areas (that is, VOC control region 1, or ASTM class B during summer) and 8.1 psi in northern areas (that is, VOC control region 2, or ASTM class C during summer). The difference in climate between the two areas requires a corresponding difference in fuel (e.g., gasoline) volatility to achieve the same emissions effect. As such, the high ozone season is selected to be June 1-September 15 by the EPA as most ozone violations occur during this period. Since fuels with higher RVP evaporate more easily than fuels with lower RVP, by mandating a fuel with a lower RVP during summer seasons, the VOC emissions of the summer-grade fuel can be decreased, and ozone violations can be reduced.

Fuel produced during the winter may have higher levels of butane than fuel produced during the summer due to the reduced engine performance in cold atmospheric conditions. Thus, the fuel produced during the summer may decrease engine performance if used during winter temperatures. This may be most apparent during engine cold start and may increase the time it takes an engine to reach its ideal operating temperature, leading to increased emissions and decreased efficiency. Therefore, fuel remaining in an underutilized high or low octane fuel tank may be of an inappropriate seasonal grade and may contribute to operational losses and increased emissions.

In an exemplary embodiment, emissions may be decreased by injecting an amount of atmospheric air into an exhaust manifold in a relatively hot portion of the exhaust system.

In an embodiment utilizing secondary air injection, the fuel-air mixture in the cylinders is intentionally rich, and atmospheric air is injected into the engine exhaust system. Oxygen within the air may oxidize or burn unburnt hydrocarbons remaining in the exhaust, thus increasing exhaust temperature for fast catalyst light-off while reducing the hydrocarbon content of emitted exhaust.

At high exhaust temperatures, secondary air injection may be more effective. Therefore, when secondary air injection is desired, the temperature of exhaust gas may be increased. One example method to increase the temperature includes increasing spark retard. High spark retard allows for exhaust gas to escape a combustion chamber with decreased temperature drop. However, less work may be captured by expanding gas in a piston cycle resulting in engine efficiency and performance losses. Other embodiments may use increased enrichment to increase oxidation with secondary air, however, this may lead to decreased fuel efficiency and may adversely affect the emission advantages associated with secondary air injection.

Some hydrocarbons may be easier to oxidize within secondary air injection. For example, low octane compounds may be more volatile than their high octane counterparts. Exhaust gas rich in low octane fuel may therefore achieve efficient secondary air oxidation with less enrichment or decreased spark retard than exhaust gas rich in high octane fuel.

Thus, in an embodiment, an amount of spark retard may be reduced when low octane fuel is being injected from a fuel separation system utilizing secondary air injection. Alternately, when the fuel injected into the engine has a high octane level, and thus the compounds within exhaust gas have a higher octane level, spark retard may be increased so as to achieve desirable hydrocarbon oxidation during secondary air injection. In another example, when low octane fuel is being injected into the engine at a high rate, secondary air injection may be initiated and when high octane fuel is being injected into the engine, secondary air injection may be decreased or terminated. Thus the efficiency and performances losses associated with secondary air injection may be minimized in a system with selective octane level fuel injection.

In further embodiments, when secondary air injection is initiated or desired, an amount of low octane fuel delivered to the engine may increased and an amount of high octane fuel may be decreased.

FIG. 1 is a schematic diagram showing one cylinder of multi-cylinder engine 10, which may be included in a propulsion system of an automobile. The engine may be fuel via natural gas, gasoline, or both. A control system may control engine operation via controller 12 that may be responsive to various sensors within the engine system and input from vehicle operator 132 via an input device 130. Input device 130 may include an accelerator pedal and a pedal position sensor 134 for generating a proportional pedal position signal PP. Cylinder 30 of engine 10 may exist between cylinder walls 32 and piston 36 may be positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system.

Cylinder 30 may receive intake air from intake manifold 44 via intake passage 42 and may exhaust combustion gases via exhaust passage 48.

Intake manifold 44 and exhaust passage 48 may selectively communicate with cylinder 30 via respective intake valve 52 and exhaust valve 54. In some embodiments, cylinder 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, a cylinder may include an intake valve controlled via electric valve actuation and an exhaust valve controlled via cam actuation.

Fuel injector 66 is shown coupled directly to cylinder 30 for injecting fuel directly therein. An amount of fuel injection may be proportional to pulse width of signal FPW received from controller 12 via electronic driver 68. In this manner, fuel injector 66 provides what is known as direct injection of fuel into cylinder 30. The fuel injector may be mounted in the side of the cylinder or in the top of the cylinder, for example. Fuel may be delivered to fuel injector 66 by a fuel system (not shown) including a fuel tank, a fuel pump, and a fuel rail. In some embodiments, cylinder 30 may alternatively or additionally include a fuel injector arranged in intake manifold 44 in a port injection configuration.

Injected fuel may be natural gas or liquid gasoline such as petroleum or diesel. Some embodiments may include both a natural gas fuel injector and a liquid gasoline fuel injector. In primarily natural gas engines, gasoline may be injected in the absence of available NG. Other embodiments may inject gasoline in response to operating conditions such as high engine temperature, pre-ignition, or engine knock indication.

Intake passage 42 may include a throttle 62 having a throttle plate 64. The position of throttle plate 64 may be varied by controller 12 via a signal provided to an electric motor or actuator in an electronic throttle control (ETC) configuration. In this manner, throttle 62 may be operated to vary the intake air provided to cylinder 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 may provide an ignition spark to cylinder 30 via spark plug 82 in response to spark advance signal SA from controller 12. In some embodiments, one or more other cylinders of engine 10 may be operated in a compression ignition mode, with or without an ignition spark.

Exhaust gas sensor 126 is shown coupled to exhaust passage 48 upstream of emission control device 70. Sensor 126 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, emission control device 70 may be periodically regenerated during operation of engine 10 by operating at least one cylinder of the engine within a particular air/fuel ratio resulting in heightened heat generation.

Engine 10 may further include a compression device such as a turbocharger or supercharger wherein a compressor is arranged along intake manifold. For a turbocharger, a compressor may be at least partially driven by a turbine (e.g. via a shaft) arranged along an exhaust passage. One or more of a wastegate and a compressor bypass valve may also be included to control flow through the turbine and compressor. For a supercharger, a compressor may be at least partially driven by the engine and/or an electric machine, and may not include a turbine. Thus, the amount of compression provided to one or more cylinders of the engine via a turbocharger or supercharger may be varied by controller 12.

Controller 12 is shown in FIG. 1 as a microcomputer, comprising microprocessor unit 102, input/output ports 104, an electronic storage medium for executable programs and calibration values shown as read-only memory 106, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used.

Storage medium read-only memory 106 may be programmed with computer readable data with instructions executable by CPU 102 for performing disclosed and other methods.

As described above, FIG. 1 shows one cylinder of a multi-cylinder engine, and each cylinder may similarly include its own set of intake/exhaust valves, fuel injector, additive injector, spark plug, etc.

Figure 2:
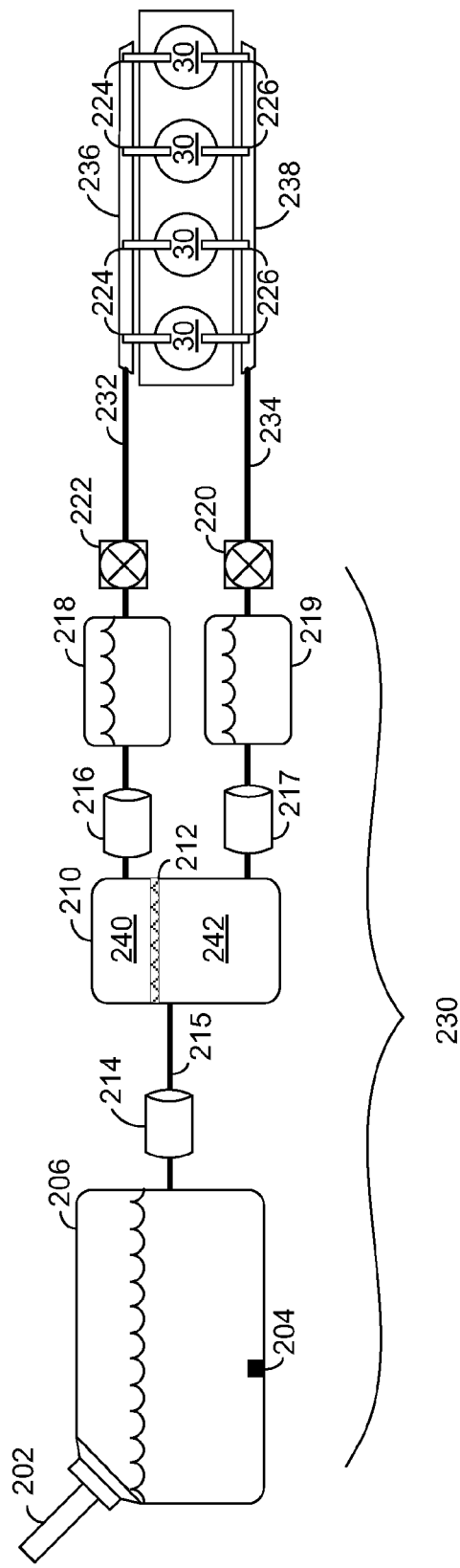
FIG. 2 depicts an example embodiment of a three-tank fuel system with a fuel separator.

FIG. 2 schematically depicts an exemplary fuel system equipped with fuel separation for a four cylinder combustion engine. Cylinders 30 may be configured as part of a cylinder head. In FIG. 2, the cylinder head is shown with 4 cylinders in an inline configuration. In some examples, a cylinder head may have more or fewer cylinders, for example six cylinders. In some examples, the cylinders may be arranged in a V configuration or other suitable configuration.

The cylinders 30 are shown coupled to fuel system 230. Cylinder 30 is shown coupled to fuel injectors 224 and 226. In this embodiment, both fuel injectors 224 and 226 inject fuel directly into a cylinder 30, each cylinder having one or more respective injectors. Each fuel injector may be configured to deliver a specific quantity of fuel at a specific point in the engine cycle in response to commands from controller 12. One or both fuel injectors may be utilized to deliver combustible fuel to cylinder 30 during each combustion cycle. The timing and quantity of fuel injection may be controlled as a function of engine operating conditions. Control of the timing and quantity of fuel injection will be further discussed below and with regards to FIGS. 5-18.

Externally filled fuel tank 206 is shown with an amount of gasoline located therein. A fill neck 202 may allow for fuel to be periodically replenished from a source outside of the vehicle. Fill neck 202 may be directly coupled to an outer side panel of the vehicle. The fill neck may have a fuel inlet on the outer surface of the vehicle in which a fuel nozzle may be inserted, the fill neck may have an outlet within the externally filled fuel tank where fuel added via the inlet may be deposited and stored. Externally filled fuel tank 206 may have a sensor 204. Sensor 204 may be communicatively coupled to a control system and may measure octane level, fuel volatility, or fuel level, for example.

A fuel pump 214 may be located within a delivery line 215 (or inside tank 206) and may accelerate fuel within delivery line 215 from externally filled fuel tank 206 to fuel separator 210. Delivery line 215 may couple externally filled fuel tank 206 to the fuel separator alone and may not be directly coupled to any other fuel tanks. Delivery line 215 may supply fuel in one direction: from the externally filled fuel tank 206 to the fuel separator 210 and thus may not receive fuel or gasoline from any source other than externally filled fuel tank 206. Pump 214 may accelerate fuel into a high pressure side 242 of fuel separator 210. The high pressure side may be maintained at a pressure above a vapor pressure of one or more compounds of gasoline. A low pressure side 240 of separator 210 may be maintained at a pressure below that of high pressure side 242. The high pressure side 242 may be separated from a low pressure side 240 by a membrane 212.

Membrane 212 may be a selectively permeable membrane that may allow some compounds to permeate into low pressure side 240. High octane components within gasoline may permeate across the membrane 212 more readily than low octane compounds. Compounds permeating across membrane 212 may be in a vaporous form. The vapor may be condensed into a liquid in part of low pressure side 240 or in an external vessel (not shown).

Low pressure side 240 may be coupled at a high octane outlet to a high octane fuel tank 218 via fuel pump 216. High pressure side 242 may be coupled at a low octane outlet to a low octane fuel tank 219 via a fuel pump 217.

High octane fuel tank 218 may not directly receive fuel from any source other than fuel separator 210 and may be located along first fuel line 232. Further, unlike externally filled fuel tank 206, high octane fuel tank 218 may not receive fuel from a source outside of the vehicle and may not be filled by a user or coupled to the outside of the vehicle. First fuel line 232 may carry fuel in one direction: from fuel separator 210 to first fuel rail 236. Low octane fuel tank 219 may not directly receive fuel from any source other than fuel separator 210 and may be located along second fuel line 234. Further, unlike externally filled fuel tank 206, low octane fuel tank 219 may not receive fuel from a source outside of the vehicle and may not be filled by a user or be coupled to the outside of the vehicle. Second fuel line 234 may carry fuel in one direction: from fuel separator 210 to second fuel rail 238.

Fuel injectors 224 are shown coupled to first fuel rail 236. Fuel rail 236 may be fluidically coupled to a first fuel line 232. First fuel line 232 may be fluidically coupled to high octane fuel tank 218. Fuel valve 222 may be fluidically coupled to high octane fuel tank 218 and first fuel line 232. First fuel rail 236 may include a plurality of sensors, including a temperature sensor and a pressure sensor. Similarly, first fuel line 232 and high octane fuel tank 218 may include a plurality of sensors, including temperature and pressure sensors. High octane fuel tank 218 and low octane fuel tank 219 may have a smaller volume than externally filled fuel tank 206.

Valves 220 and 222 may be communicatively coupled to a control system and may be independently actuated in response to engine operating conditions and/or fuel conditions such as fuel level or staleness in the externally filled fuel tank, the high octane fuel tank, or the low octane fuel tank. In some embodiments, valves 220 and/or 222 may not be required.

First fuel line 232 may couple high octane fuel tank 218 to first fuel rail 236. First fuel rail 236 may run along cylinders 30 and may be fluidically coupled to a number of fuel injectors corresponding to each of cylinders 30. Second fuel line 234 may couple low octane fuel tank 219 to second fuel rail 238. Second fuel rail 238 may run along cylinders 30 and may be coupled to a number of fuel injectors corresponding to each cylinder 30. Fuel injectors may be controlled by a control system and may inject fuel prior to ignition application. The injection of high octane fuel via injectors 224 and low octane fuel via injectors 226 may be actuated by a control system in response to engine operating conditions.

Figure 3:
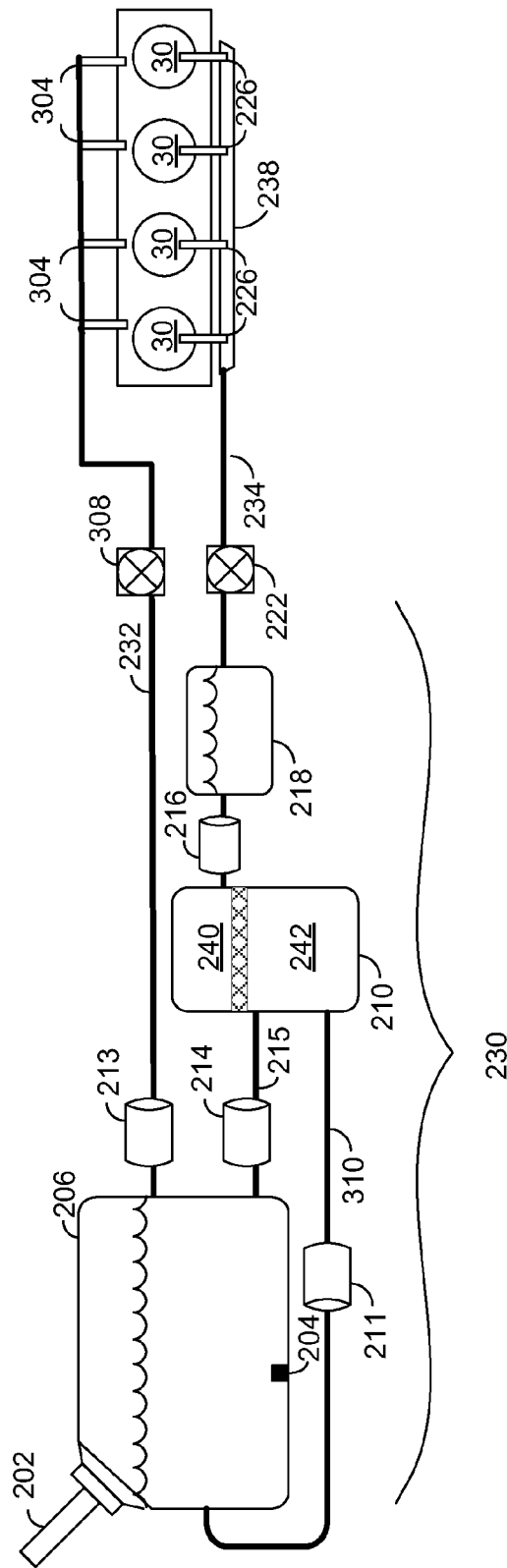
FIG. 3 depicts an example embodiment of a two-tank fuel system with a fuel separator.

FIG. 3 schematically depicts an exemplary fuel system equipped with fuel separation for a four cylinder engine system such as that depicted in FIG. 2.

The cylinders 30 are shown coupled to fuel system 230. Cylinders 30 are shown coupled to fuel injectors 226. In this example embodiment, fuel injectors 226 inject fuel directly into cylinders 30, each cylinder having one or more respective injectors. Each fuel injector may be configured to deliver a specific quantity of fuel at a specific crank angle in response to commands from controller 12. The fuel injectors 226 may deliver combustible fuel to cylinder 30 during each combustion cycle. The timing and quantity of fuel injection may be controlled as a function of engine operating conditions.

Port fuel injectors 304 may be fluidically coupled to first fuel line 232 such that the engine is equipped with both direct injection and port injection. Port fuel injectors 304 may inject fuel into the intake ports upstream of the cylinders intake valves. Thus fuel may mix with air prior to induction into the cylinders. In comparison to direct injection, this may allow for fuel to be distributed more homogenously throughout an intake air stream prior to combustion.

Direct fuel injectors 226 may be fluidically coupled to high octane fuel tank 218. Port fuel injectors 304 may be fluidically coupled to an externally filled fuel tank 206 or a low octane fuel tank. To prevent engine knock at high loads, high octane fuel may be injected directly into the cylinders to prevent auto-ignition. Direct injection of high octane fuel may offer improved response times and higher precision than port injection to effectively prevent engine knock. Port injectors 304 may be fluidically coupled to a low octane fuel source such as an externally filled fuel tank 206 or low octane fuel tank. Port injection of a low octane and energy dense fuel allows for increased fuel to air mixing for efficient combustion. Thus direct injection of high octane fuel and port injection of low octane fuel may be used in combination in an embodiment.

Further embodiments may have both a low octane direct injector as well as a high octane direct injector. Still further embodiments may have both a low octane port injector as well as a high octane port injector. Thus a control system may determine an amount of low octane fuel and an amount of high octane fuel to inject into the intake ports in response to operating conditions. Further, a control system may determine an amount of high octane fuel and an amount of low octane fuel to inject directly into the engine cylinders in response to operating conditions. For example, a control system may determine a high octane to low octane ratio to achieve a first octane level for port injection and second high octane to low octane ratio to achieve a second octane level for direct injection.

In further examples, the high octane fuel line may merge with the low octane fuel line upstream of a port or direct injector. An amount of high octane fuel and low octane fuel delivered to the merged fuel line may be in response to engine operating conditions via one or more valves at a merge point or upstream of a merge point within the high octane and/or low octane fuel lines. In this embodiment, a single port injector and a single direct injector may deliver either high octane fuel, low octane fuel, or some combination thereof to an intake port and to a cylinder respectively.

Externally filled fuel tank 206 is shown with an amount of gasoline located therein. A refuel port with a fill neck 202 may allow for fuel to be periodically replenished. Externally filled fuel tank 206 may have a sensor 204. Sensor 204 may be communicatively coupled to a control system and may measure octane level, fuel volatility, or fuel level, for example. Controller 12 may actuate a valve within a delivery line 215 that is delivering fuel to a fuel separator 210. A valve and/or pump 214 may be utilized for metering, initiating, and terminating fuel delivery.

A fuel pump 214 may couple externally filled fuel tank 206 to fuel separator 210. Pump 214 may accelerate fuel into a high pressure side 242 of fuel separator 210. The high pressure side may be maintained at a pressure above a vapor pressure of one or more compounds of gasoline. A low pressure side 240 of separator 210 may be maintained at a pressure below that of high pressure side 242. The high pressure side 242 may be separated from a low pressure side 240 by a membrane 212. Membrane 212 may be a selectively permeable membrane that may allow some compounds to permeate into low pressure side 240. High octane components within gasoline may permeate across the membrane 212 more readily than low octane compounds. Compounds permeating across membrane 212 may be in a vaporous form. The vapors may be condensed into a liquid in part of low pressure side 240 or in an external vessel (not shown).

Low pressure side 240 may be coupled at a high octane outlet to a high octane fuel tank 218 via fuel pump 216. High pressure side 242 may be coupled at a low octane outlet to externally filled fuel tank 206 via fuel line 310 and fuel pump 211.

Direct fuel injectors 226 are shown coupled to DI fuel rail 238. DI fuel rail 238 may be fluidically coupled to second fuel line 234. Second fuel line 234 may be fluidically coupled to high octane fuel tank 218. Fuel pump 216 may be fluidically coupled to high octane fuel tank 218 and second fuel line 234. DI fuel rail 238 may include a plurality of sensors, including a temperature sensor and a pressure sensor. A fuel valve 222, which may be a three way valve, may selectively couple second fuel line 234 to either direct injectors 226 or port injectors 304.

Similarly, first fuel line 232 may include a plurality of sensors, including temperature and pressure sensors. High octane fuel tank 218 may have a smaller volume than externally filled fuel tank 206.

A fuel separator may have a low octane outlet coupling a low octane side of separator 210 to a fuel return line 310. Fuel may be accelerated through return line 310 via fuel pump 211. Return line 310 may couple a side of a separator 210 to externally filled fuel tank 206. Low octane fuel may be circulated back into an externally filled fuel tank where it may mix with gasoline.

Valves 308 and 222 may be communicatively coupled to a control system and may be independently actuated in response to engine operating conditions and/or fuel conditions such as fuel level or staleness in the externally filled fuel tank, the high octane fuel tank, or the low octane fuel tank.

First fuel line 232 may couple the externally filled fuel tank 206 to port injectors 304 via fuel pump 213 and valve 308. Externally filled fuel tank 206 may be fluidically coupled to first fuel rail 236 via a first fuel line 232. First fuel rail 236 may run along cylinders 30 and may be fluidically coupled to a number of fuel injectors corresponding to each cylinder 30. Second fuel line 234 may couple high octane fuel tank 218 to second (DI) fuel rail 238. First fuel rail 236 may run along cylinders 30 and may be fluidically coupled to a number of fuel injectors corresponding to each cylinder 30. Fuel injectors may be controlled by a control system and may inject fuel prior to ignition application. The injection of high octane fuel via injectors 226 and low octane fuel via injectors 304 may be actuated by a control system in response to engine operating conditions.

Figure 4:
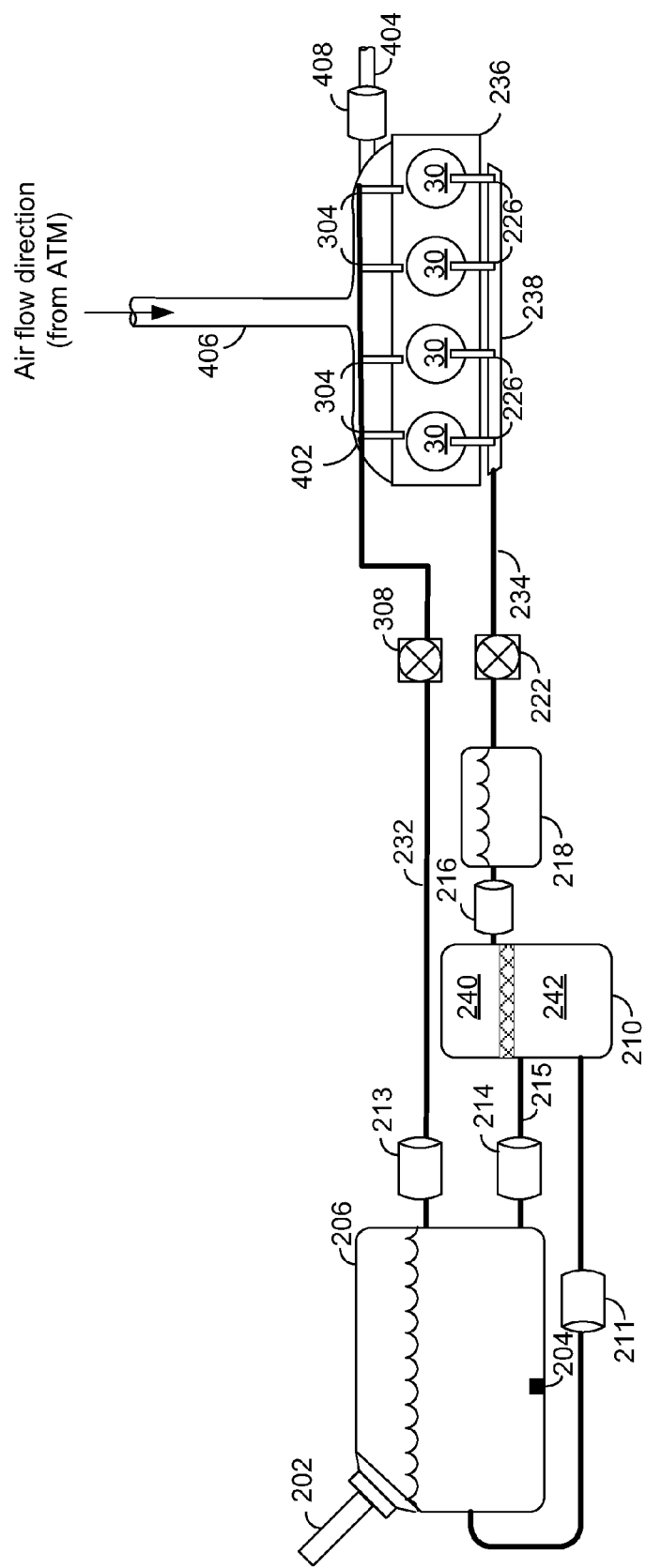
FIG. 4 depicts an additional example embodiment of a two-tank fuel system with a fuel separator and secondary air injection.

FIG. 4 depicts an embodiment with a fuel system 230 similar to that of FIG. 3. The embodiment of FIG. 4 further includes a secondary air injection system. In secondary air injection, atmospheric air may be injected into an exhaust system. A secondary air injection system may have secondary air intake 404 coupled to an externally filled intake system for delivery of air to an intake manifold. In further embodiments, a secondary air injection system may have an independent secondary air intake 404 for delivery of air to an exhaust system.

Secondary air intake 404 may have an air pump 408 that may be operatively located in a secondary air intake. Air pump 408 may be actuated by a control system and may control an amount of air delivered to an exhaust manifold for secondary combustion. An amount of air delivered to an exhaust manifold 402 may be dependent on one or more operating conditions which may include an octane level of fuel being injected into an engine cylinder. For example, if catalyst lightoff is desired and low octane fuel is being injected into an engine cylinder at a high rate, an amount of air delivered to an exhaust manifold may increase.

An exhaust pipe may be coupled to an exhaust manifold and may include one or more turbines, emission control devices, and mufflers. An exhaust pipe may emit exhaust gases into the atmosphere. In some embodiments, exhaust gases may be recirculated, in part, back into the intake system.

Figure 5:
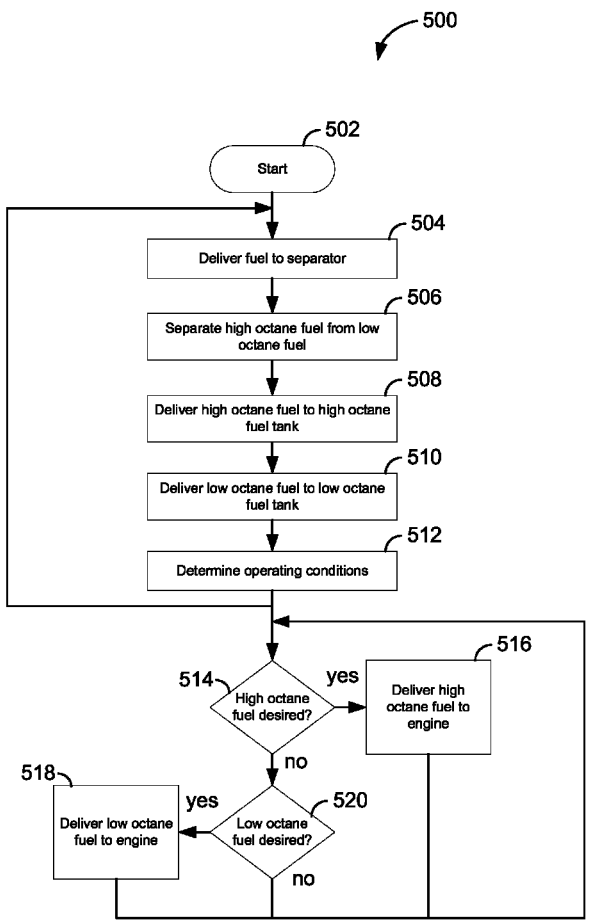
FIG. 5-FIG. 12 depict example operating methods for a fuel system with fuel separation.

FIG. 5 shows a flowchart depicting method 500 in accordance with the present disclosure. Method 500 may be carried out by controller 12. Method 500 may be used in a configuration such as that depicted in FIGS. 1-4. Method 500 may be used in combination or may be a subroutine of methods that may or may not be otherwise indicated within this disclosure.

Method 500 may begin at 502 and may be initiated by an engine starting event or a refueling event. A refueling event may comprise adding fuel to an externally filled fuel tank from an external source. At 504, fuel may be delivered from an externally filled fuel tank to a fuel separator via a fuel delivery line that may contain a fuel pump. Here a separator may be any type of fuel separator and may or may not be the separator described above or an octane based separator. For example, a separator may separate blended fuel into ethanol and gasoline without departing from the scope of this disclosure.

At 506 the fuel within the separator may be separated into a high octane portion and a low octane portion. As described above, a separator may separate fuel based on octane level. In other embodiments, fuel may be separated by other fuel characteristics that result in one portion of the separated fuel having a higher octane level than the other portion of the separated fuel. A high octane fuel and the low octane fuel may be physically separated within the separator. In an embodiment, fuel may be separated by a semi-permeable membrane, a physical barrier, a method involving addition of water or other substance, or high octane fuel may be in a more upper portion of the gasoline within the separator than low octane fuel or vice versa.

At 508, high octane fuel may be delivered to a high octane fuel tank. In some embodiments, the high octane side of the fuel tank may have a first outlet. High octane fuel may, in some embodiments, be released from the separator in a gaseous form. In such an embodiment, high octane fuel may be condensed into a liquid state in a condenser separate from the high octane fuel tank or within the high octane fuel tank.

In embodiments having an externally filled fuel tank with a refuel port, a high octane fuel tank, and a low octane fuel tank, the high octane fuel tank may receive high octane fuel at 508. In embodiments recirculating high octane fuel into the externally filled fuel tank, the high octane fuel tank may refer to the externally filled fuel tank.

At 510 low octane fuel may be delivered to a low octane fuel tank. In embodiments having an externally filled fuel tank with a refuel port, a high octane fuel tank, and a low octane fuel tank the low octane fuel tank may receive low octane fuel at 510. In embodiments recirculating low octane fuel into an externally filled fuel tank, the low octane fuel tank may refer to the externally filled fuel tank.

For the purposes of this disclosure, high octane fuel refers to fuel that may have an octane rating or an octane level above a threshold, wherein the octane rating may be an aggregate average of the compounds within the high octane fuel. Similarly, low octane fuel refers to fuel that may have an octane rating or an octane level below a threshold, wherein the octane rating may be an aggregate average of the compounds within the low octane fuel. In other words, the high octane fuel, when taken as a whole, may tend to auto-ignite less readily than the low octane fuel.

An octane rating may refer to a comparison of a test fuel to a fuel containing purely iso-octane and heptanes. For example, a fuel with an octane rating of 70 may have the same detonation resistance of a fuel combination that is 70% iso-octane and 30% heptane. Fuels with an octane rating above 100 exhibit greater detonation resistance than pure octane. Detonation resistance may be determined by a number of different methods. Though fuel measured by a first method may show a detonation resistance of a first iso-octane-heptane ratio, fuel measured by a second method may show a detonation resistance of a second iso-octane-heptane ratio. Thus each detonation resistance method yields different octane numbers, three common octane numbers are Research Octane Number (RON), Motor Octane Number (MON), or an average of RON and MON called Anti-Knock Index (AKI).

Operating conditions may be determined at 512. Engine operating conditions may be measured, estimated, or inferred, and may include various vehicle conditions, such as vehicle speed, as well as various engine conditions, such as engine speed, engine temperature, exhaust temperature, boost level, MAP, MAF, torque demand, horsepower demand, etc. Determining engine operating conditions may include determining whether the engine is operating at a high load condition. Herein, a high load condition may be defined as a load that is greater than an upper threshold, for example, 75% of maximum load, as compared to a load that is greater than a lower threshold.

At 514 it may be determined if high octane fuel is desired within the engine. This determination may be made via another sub-routine that may or may not be otherwise disclosed herein. High octane fuel may be desired for a number of reasons including the engine load or speed being above a threshold, the temperature in the engine being above a threshold, the fuel level in a low octane fuel tank being below a threshold, the fuel level of the high octane fuel tank being below a threshold, the volume of air charge delivered to the engine cylinders being above a threshold, knock sensor signal being above a threshold, fuel staleness being above a threshold, or some combination thereof. One such combination may determine that high octane fuel is desired if the engine is operating under conditions that may contribute to engine knock; this determination may be a function of several operating conditions. If high octane fuel is desired, high octane fuel may be delivered to an engine cylinder via the actuation of a fuel injector and/or via the actuation of a valve and/or pump in a high octane fuel line or fuel rail.

In embodiments wherein the engine is coupled to a high octane fuel tank, a low octane fuel tank, and an externally filled fuel tank it may be determined if low octane fuel is desired at 520. Similar to step 514, low octane fuel octane fuel may be desired for a number of reasons. If low octane fuel is desired, method 500 may continue to 518. In embodiments wherein two fuel tanks are coupled to engine, a 'no' determination at 514 may proceed directly to the step at 518.

At 518, low octane fuel may be delivered to the engine. This may be initiated via the actuation of one or more port and/or direct fuel injectors and/or the actuation of a valve and/or pump in a low octane fuel line or fuel rail. Method 500 may repeat at given intervals or continuously throughout engine operation. Parts of method 500 may repeat independently of other parts of method 500. For example, after an amount of fuel separation has occurred, steps 504-512 may repeat in rapid succession or at given intervals without regard to the steps below. Similarly, steps 514-520 may repeat with each injection of fuel into the engine, at given intervals, or in rapid succession without regard to the preceding steps.

Figure 6:
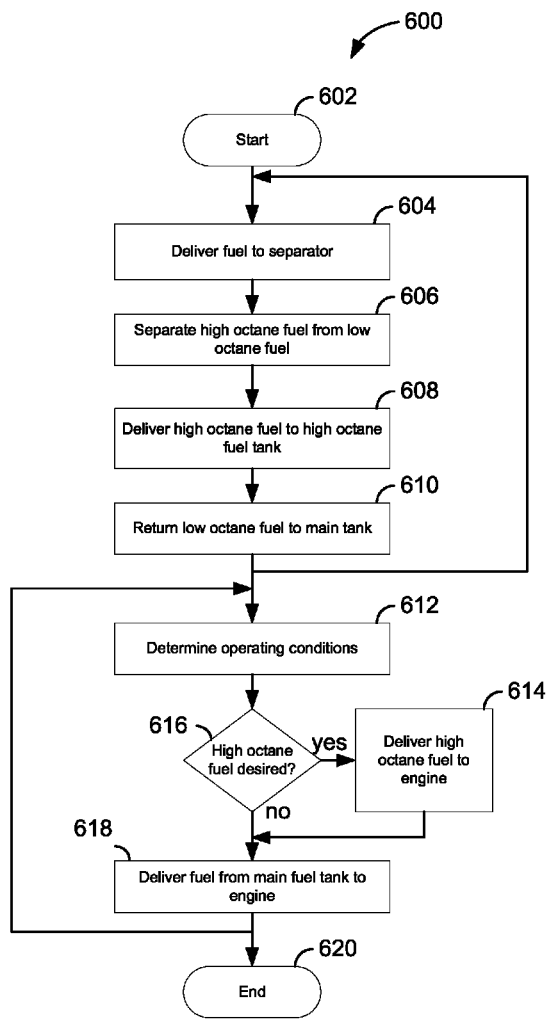

FIG. 6 shows a flowchart depicting method 600 in accordance with the present disclosure. Method 600 may be carried out by controller 12. Method 600 may be used in a configuration such as that depicted in FIGS. 1-4. Method 600 may be used in combination or may be a subroutine of methods that may or may not be otherwise indicated within this disclosure.

Method 600 may begin at 602 and may be initiated by an engine starting event or a refueling event. A refueling event may comprise adding fuel to the externally filled fuel tank from an external source. At 604 fuel may be delivered from the externally filled fuel tank to a fuel separator. Here a separator may be any type of fuel separator and may or may not be the separator described above or an octane based separator. For example, a separator may separate blended fuel into ethanol and gasoline without departing from the scope of this disclosure.

At 606 the fuel within the separator may be separated into a high octane portion and a low octane portion. As described above, a separator may separate fuel based on octane level. In other embodiments fuel may be separated by other fuel characteristics that result in one portion of the separated fuel having a higher octane level than the other portion of the separated fuel. Within a fuel separator, at 606, the high octane fuel and the low octane fuel may be physically separated within the compressor separator. In an embodiment, fuel may be separated by a semi-permeable membrane, a physical barrier, a method involving addition of water or other substance, or high octane fuel may be in a more upper portion of the gasoline within the separator than low octane fuel or vice versa.

At 608, high octane fuel may be delivered to a high octane fuel tank. In some embodiments, the high octane portion of the fuel separator may have a first outlet. High octane fuel may, in some embodiments, be released from the separator in a gaseous form. In such an embodiment, high octane fuel may be condensed into liquid form in a condenser separate from the high octane fuel tank or within the high octane fuel tank.

At 610, low octane fuel may be recirculated back into an externally filled fuel tank via a fuel return line. In embodiments having an externally filled fuel tank with a refuel port and a high octane fuel tank, the externally filled fuel tank may receive low octane fuel at 610.

Operating conditions may be determined at 612. Engine operating conditions may be measured, estimated, or inferred, and may include various vehicle conditions, such as vehicle speed, as well as various engine operating conditions, such as engine speed, engine temperature, exhaust temperature, boost level, MAP, MAF, torque demand, horsepower demand, etc. Determining engine operating conditions may include determining whether the engine is operating at a high load condition. Herein, a high load condition may be defined as a load that is greater than an upper threshold, for example, 75% of maximum load, as compared to a load that is greater than a lower threshold.

At 616 it may be determined if high octane fuel is desired within the engine. This determination may be made via another sub-routine that may or may not be disclosed here. High octane fuel may be desired for a number of reasons including the engine load or speed being above a threshold, the temperature in the engine being above a threshold, the fuel level in a low octane fuel tank being below a threshold, the fuel level of the high octane fuel tank being below a threshold, the volume of air charge delivered to the engine cylinders being above a threshold, knock sensor signal being above a threshold, fuel staleness being above a threshold, or some combination thereof. One such combination may determine that high octane fuel is desired if the engine is operating under conditions that contribute to engine knock; this determination may be a function of several operating conditions. If high octane fuel is desired, high octane fuel may be delivered to an engine cylinder via the actuation of a fuel injector and/or via the actuation of a valve and/or pump in a high octane fuel line or fuel rail.

Method 600 may continue to 618 where fuel from the externally filled fuel tank may be injected into the engine. An amount of fuel delivered from the externally filled fuel tank may be determined as a function of operating conditions, a desired octane level, the presiding octane level within the externally filled fuel tank, the amount of high octane fuel delivered at 614, or some combinations thereof. In some embodiments no fuel may be injected into an engine at 618.

Delivery of high octane fuel and fuel from an externally filled fuel tank may be initiated via the actuation of one or more port and/or direct fuel injectors and/or the actuation of a valve and/or pump in a low or high octane fuel line or fuel rail. Method 600 may repeat at given intervals or continuously throughout engine operation. Parts of method 600 may repeat independently of other parts of method 600. For example, after an amount of fuel separation has occurred, steps 604-610 may repeat in rapid succession or at given intervals without regard to successive steps. Similarly, steps 612-620 may repeat with each injection, at given intervals, or in rapid succession without regard to the preceding steps.

Figure 7:
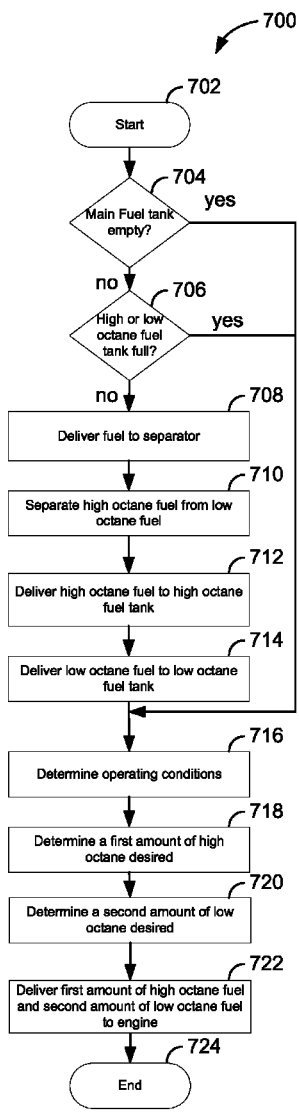

FIG. 7 shows a flowchart depicting method 700 in accordance with the present disclosure. Method 700 may be carried out by controller 12. Method 700 may be used in a configuration such as that depicted in FIGS. 1-4. Method 700 may be used in combination or may be a subroutine of methods that may or may not be otherwise indicated within this disclosure. For example, method 700 may be used in combination with method 500 and 600.

Method 700 may begin at 702 and may be initiated by an engine starting event or a refueling event. A refueling event may comprise adding fuel to an externally filled fuel tank from an external source. At 704 it may be determined if the externally filled fuel tank is empty. If the externally filled fuel tank is not empty, it may be determined if a high or low octane fuel tank is empty. In embodiments having either a high or low octane fuel tank and equipped with a return line, it may be determined if the fuel tank that is not the externally filled fuel tank is empty. In embodiments having both a high and low octane fuel tank as well as an externally filled fuel tank, it may be determined if either the high octane fuel tank or the low octane fuel tank is empty.

If the neither a high octane fuel tank, low octane fuel tank, or externally filled fuel tank are empty, method 700 may move to 708. At 708, fuel may be delivered from an externally filled fuel tank to a fuel separator. Here a separator may be any type of fuel separator and may or may not be the separator described above or an octane based separator. For example, a separator may separate blended fuel into ethanol and gasoline without departing from the scope of this disclosure.

At 710, the fuel within the separator may be separated into a high octane portion and a low octane portion. As described above, a separator may separate fuel based on octane level. In other embodiments fuel may be separated by other fuel characteristics that result in one portion of the separated fuel having a higher octane level than the other portion of the separated fuel. At 710 the high octane fuel and the low octane fuel may be physically separated within the fuel separator. In an embodiment, fuel may be separated by a semi-permeable membrane, a physical barrier, a method involving addition of water or other substance, or high octane fuel may be in a more upper portion of the gasoline within the separator than low octane fuel or vice versa.

At 712, high octane fuel may be delivered to a high octane fuel tank. In some embodiments, the high octane portion of the fuel separator may have a first outlet. High octane fuel may, in some embodiments, be released from the separator in a gaseous form. In such an embodiment, high octane fuel may be condensed into liquid form in a condenser separate from the high octane fuel tank or within the high octane fuel tank.

In embodiments having an externally filled fuel tank with a refuel port, a high octane fuel tank, and a low octane fuel tank, the high octane fuel tank may receive high octane fuel at 712. In embodiments recirculating high octane fuel into an externally filled fuel tank, the high octane fuel tank may refer to the externally filled fuel tank. At 714 low octane fuel may be delivered to a low octane fuel tank. In embodiments having an externally filled fuel tank with a refuel port, a high octane fuel tank, and a low octane fuel tank the low octane fuel tank may receive low octane fuel at 714. In embodiments recirculating low octane fuel into an externally filled fuel tank, the low octane fuel tank may refer to the externally filled fuel tank. Method 700 may then continue to 716.

If it is determined at 704 or 706 that any of a high octane, low octane, or externally filled fuel tank is empty method 700 may continue directly to 716.

Operating conditions may be determined at 716. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc. Determining engine operating conditions may include determining whether the engine is operating at a high load condition. Herein, a high load condition may be defined as a load that is greater than an upper threshold, for example, 75% of maximum load, as compared to a load that is greater than a lower threshold.

At 718 an amount of high octane fuel to be delivered to the engine for combustion is determined. An amount of high octane fuel desired may be in response to several factors including engine load, engine speed, engine temperature, or a probability of engine knock. Probability of engine knock may be determined in control system and may be based on one or more operating conditions and/or based on a signal from a knock sensor. Further, an amount of high octane fuel delivered to the engine may be a function of a high-octane-to-low-octane ratio with a desired octane level as determined in a control system.

At 720 an amount of low octane fuel to deliver to the engine for combustion is determined. An amount of low octane fuel may be a function of several factors including engine load, engine speed, engine temperature, or a probability of engine knock. Further, an amount of low octane fuel delivered may be a function of a high-octane-to-low-octane ratio with a desired octane level as determined in a control system.

At 722, an amount of high octane fuel and low octane fuel determined at 718 and 720 respectively is delivered to the engine. Delivery of high and low octane fuel may be initiated via the actuation of one or more port and/or direct fuel injectors and/or the actuation of a valve and/or pump in a low or high octane fuel line or fuel rail. Method 700 may repeat at given intervals or in rapid succession throughout engine operation.

Figure 8:
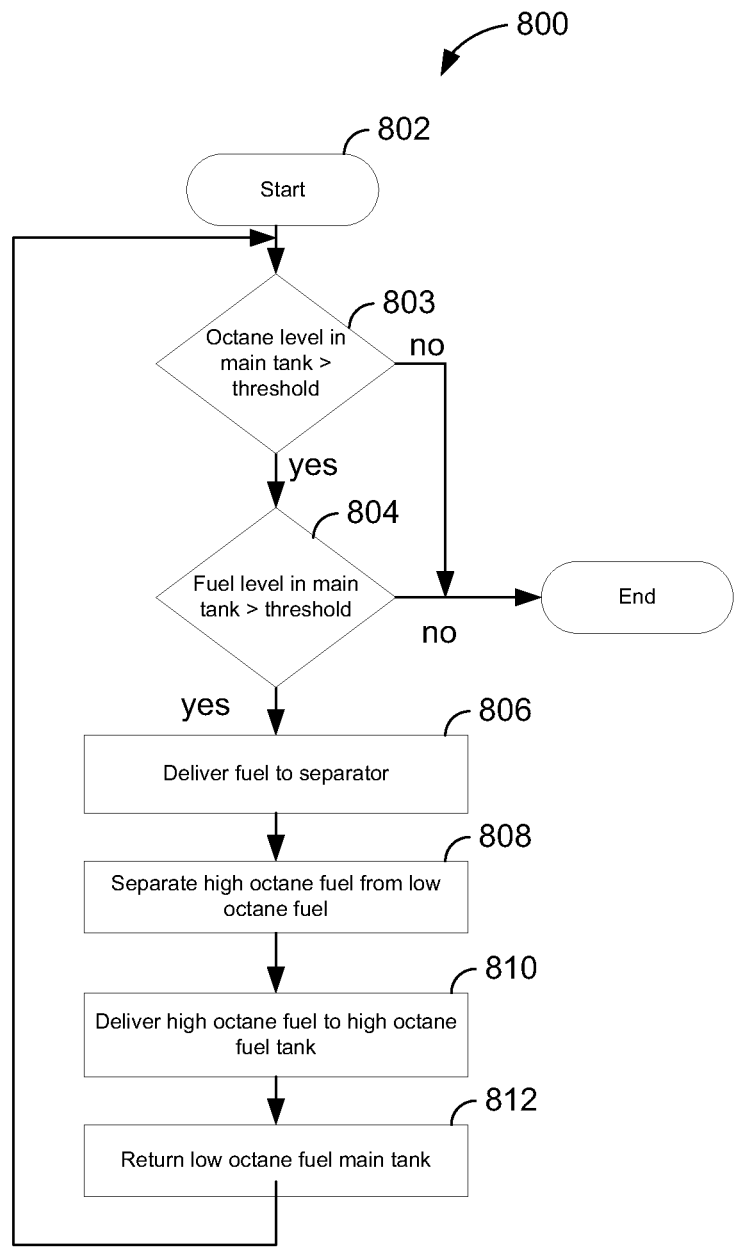

FIG. 8 shows a flowchart depicting method 800 in accordance with the present disclosure. Method 800 may be carried out by controller 12. Method 800 may be used in a configuration such as that depicted in FIGS. 1-4. Method 800 may be used in combination or may be a subroutine of methods that may or may not be otherwise indicated within this disclosure. For example, method 800 may be used in combination with method 500 and 600.

Method 800 may begin at 802 and may be initiated by an engine starting event or a refueling event. A refueling event may comprise adding fuel to an externally filled fuel tank from an external source. A fuel system may be equipped with a fuel separator with a first outlet coupled to a secondary tank and a second outlet coupled to an externally filled fuel tank with a refuel port via a return line. Fuel returned to the externally filled fuel tank may be recirculated back through the separator throughout operation, continuously removing high octane compounds from the fuel in the externally filled fuel tank. Continued fuel separation may then cause the fuel in the externally filled fuel tank to drop to a very low aggregate octane level. Fuel with very low octane levels may not support even mid-range engine loads; this could result in degraded engine performance. Thus, fuel in a high octane portion may be used to support mid-load operation and the octane level within the externally filled fuel tank may continue to fall with continued separation before triggering a re-fuel event and significant performance losses may be experienced. Thus by monitoring the octane level in an externally filled fuel tank, separation may be terminated before reaching an undesirably low octane level.

At 803 the octane level in an externally filled fuel tank may be determined and compared to a threshold. A threshold may be predetermined or decided by a controller and may be an octane level able to support mid-load operation. If the octane level of fuel in the externally filled fuel tank is above a threshold the method may continue to 804. If the octane level of fuel in an externally filled fuel tank is below a threshold the method may end. At 804 it may be determined if the level of fuel in an externally filled fuel tank is above a threshold. This may be a predetermined low fuel threshold or may correspond to an amount of fuel in a secondary fuel tank. If the level of fuel is above this threshold the method may continue to 806. If the level of fuel in the externally filled fuel tank is below this threshold the method may end. The externally filled fuel tank may be fluidically coupled to a fuel separator. At 806, fuel may be delivered to the separator.

At 808 the fuel within the separator may be separated into a high octane portion and a low octane portion. As described above, a separator may separate fuel based on octane level. In other embodiments fuel may be separated by other fuel characteristics that result in one portion of the separated fuel having a higher octane level than the other portion of the separated fuel. Within a fuel separator, at 606 the high octane fuel and the low octane fuel may be physically separated within the separator. In an embodiment, fuel may be separated by a semi-permeable membrane, a physical barrier, a method involving addition of water or other substance, or high octane fuel may be in a more upper portion of the gasoline within the separator than low octane fuel or vice versa.

At 810, high octane fuel may be delivered to a high octane fuel tank. In some embodiments, the high octane portion of the fuel separator may have a first outlet. High octane fuel may, in some embodiments, be released from the separator in a gaseous form. In such an embodiment, high octane fuel may be condensed into liquid form in a condenser separate from the high octane fuel tank or within the high octane fuel tank.

In embodiments recirculating high octane fuel into an externally filled fuel tank, the high octane fuel tank may refer to the externally filled fuel tank. Low octane fuel, as determined by the separator, may be returned to an externally filled fuel tank via a return line. The cycle may repeat until the octane level in the externally filled fuel tank falls below the aforementioned threshold. If the octane level in the externally filled fuel tank falls below an octane threshold at 802, fuel separation may end. Separation may be reinitiated in response to an engine refueling event. Fuel separation may further be initiated by an engine starting event and may be terminated by an engine off event.

Presiding octane level in an externally filled fuel tank may he determined, in some embodiments, via a knock sensor system when fuel from the externally filled tank is being used. In other embodiments an octane level may be inferred based on the amount of time separation has occurred or a volume of fuel passing through a separator or in a high octane fuel tank. Other embodiments may determine a presiding octane level using a sensor or method not otherwise disclosed herein.

Figure 9:
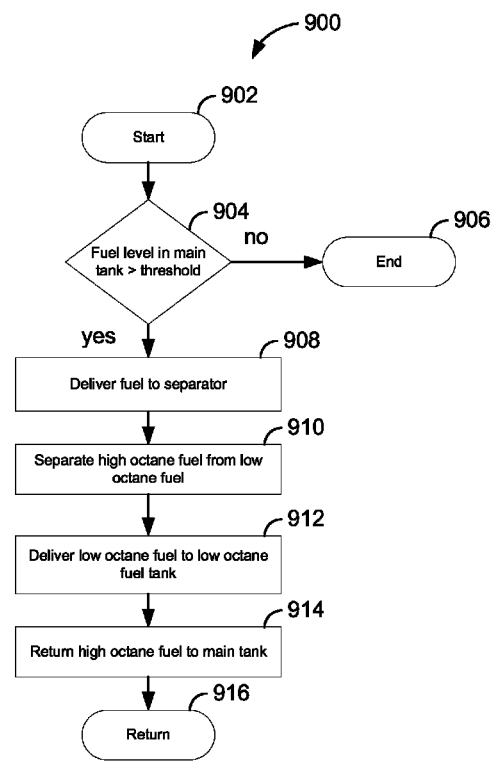

FIG. 9 shows a flowchart depicting method 900 in accordance with the present disclosure. Method 900 may be carried out by controller 12. Method 900 may be used in a configuration such as that depicted in FIGS. 1-4. Method 900 may be used in combination or may be a subroutine of methods that may or may not be otherwise indicated within this disclosure. For example, method 900 may be used in combination with method 500 and 600.

Method 900 may begin at 902 and may be initiated by an engine starting event or a refueling event. A refueling event may comprise adding fuel to an externally filled fuel tank from an external source. A fuel system equipped with a fuel separator may include a first outlet coupled to a secondary tank and a second outlet coupled to an externally filled fuel tank. Fuel returned to the externally filled fuel tank may be recirculated back through the separator throughout operation, continuously removing low octane compounds from the fuel in the externally filled fuel tank. Continued fuel separation may thus cause the fuel in the externally filled fuel tank to be depleted such that low octane fuel may not be available when desired. This may result in increased emissions, decreased fuel efficiency, and may lessen the advantages of the fuel separation system.

At 904 the level of fuel in the externally filled fuel tank may be determined and compared to a threshold. A threshold may be predetermined or decided by a controller and may be equal to an amount of fuel within the low octane fuel tank. This may ensure low octane and high octane availability for optimal injection throughout the entirety of operation before a fuel refill. This may also help to combat fuel staleness.

At 908 the fuel may be delivered to a separator. At 910 the fuel within the separator may be separated into a high octane portion and a low octane portion. As described above, a separator may separate fuel based on octane level. In other embodiments, fuel may be separated by other fuel characteristics that result in one portion of the separated fuel having a higher octane level that the other portion of the separated fuel. At 910 the high octane fuel and the low octane fuel may be physically separated within the separator. In an embodiment, fuel may be separated by a semi-permeable membrane, a physical barrier, a method involving addition of water or other substance, or high octane fuel may be in a more upper portion of the gasoline within the separator than low octane fuel or vice versa.

At 912, low octane fuel may be delivered to a low octane fuel tank. In some embodiments, the high octane portion of the fuel separator may have a first outlet. High octane fuel may, in some embodiments, be released from the separator in a gaseous form. In such an embodiment, high octane fuel may be condensed into liquid form in a condenser separate from the separator or within the separator.

In embodiments recirculating high octane fuel into an externally filled fuel tank, the high octane fuel tank may refer to the externally filled fuel tank.

At 912, low octane fuel may be delivered from a low octane outlet of a fuel separator to a secondary low octane fuel tank. The low octane fuel tank may be smaller than an externally filled fuel tank and may be independently coupled to the engine. At 914 high octane fuel may be returned to the externally filled fuel tank via a return line. In this configuration a separator may produce high octane fuel at a higher rate than low octane fuel. At 916, method 900 may repeat. After a number of repetitions of method 900, the octane level in the externally filled fuel tank may raise, effectively creating a high octane fuel tank. The octane level in an externally filled fuel tank may be proportional to the duration of fuel separation.

In embodiments wherein an effective low octane fuel tank develops from continued separation from the return of low octane fuel from an externally filled fuel tank, the octane level of fuel in the externally filled fuel tank may be inversely proportional to the duration of fuel separation. This may be true because the proportion of high octane components to low octane components in the externally filled fuel tank may shift with continued fuel separation.

Figure 10:
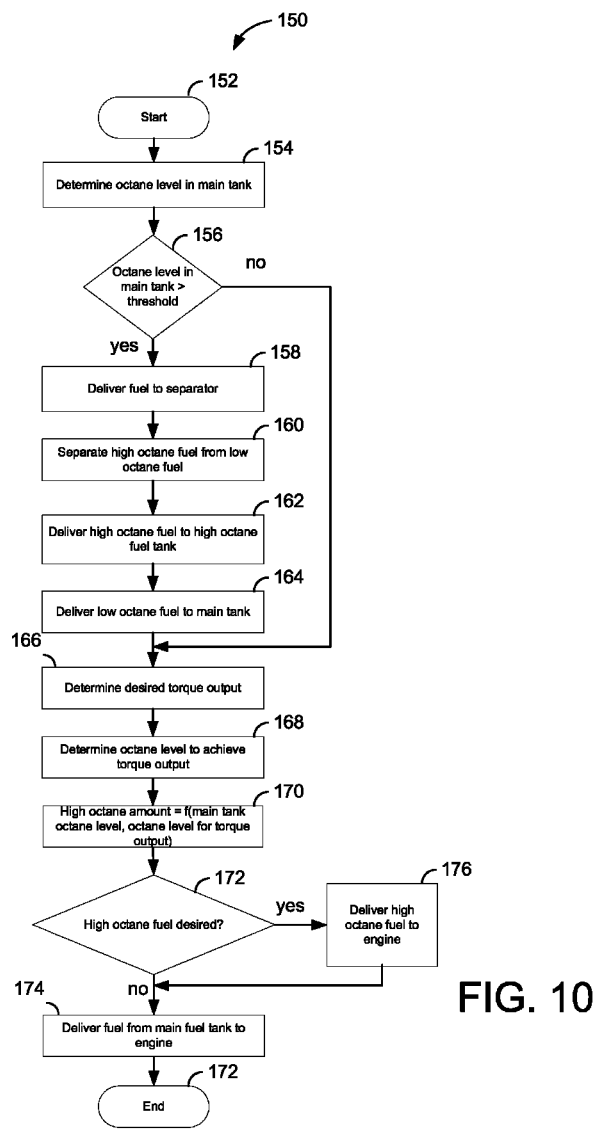

FIG. 10 shows another example operating method in accordance with the present disclosure. Method 150 may be carried out by controller 12. Method 150 may be used in a configuration such as that depicted in FIGS. 1-4. Method 150 may be used in combination or may be a subroutine of methods that may or may not be otherwise disclosed herein. For example, method 700 may be used in combination with method 500 and 600.

Method 150 may begin at 152 and may be initiated by an engine starting event or a refueling event. A refueling event may comprise adding fuel to an externally filled fuel tank from an external source. In a fuel system equipped with a fuel separator with a first outlet coupled to a secondary tank and a second outlet coupled to an externally filled fuel tank with a refuel port via a return line. Fuel returned to the externally filled fuel tank may be recirculated back through the separator throughout operation, continuously removing high octane compounds from the fuel in the externally filled fuel tank. Continued fuel separation may then cause the fuel in the externally filled fuel tank to drop to a very low aggregate octane level. Fuel with extremely low octane levels may not support even mid-range engine loads; resulting in degraded engine performance. Thus fuel in a high octane portion may be used to support mid-load operation and the octane level within the externally filled fuel tank may continue to fall with continued separation before triggering a re-fuel event which may result in significant performance losses. Thus by monitoring the octane level in an externally filled fuel tank, separation may be terminated before reaching an undesirably low octane level.

At 154 the octane level in the externally filled fuel tank may be determined and at 156 the octane level may be compared to a threshold. A threshold may be predetermined or decided by a controller and may be an octane level able to support mid-load operation. If the octane level of fuel in the externally filled fuel tank is above a threshold the method may continue to 158. If the octane level of fuel in an externally filled fuel tank is below a threshold the method may end. The externally filled fuel tank may be fluidically coupled to a fuel separator and fuel may be delivered to the separator at 158.

At 160 the fuel within the separator may be separated into a high octane portion and a low octane portion. As described above, a separator may separate fuel based on octane level. In other embodiments fuel may be separated by other fuel characteristics that result in one portion of the separated fuel having a high octane level that the other portion of the separated fuel. The high octane fuel and the low octane fuel may be physically separated within the separator. In an embodiment fuel may be separated by a semi-permeable membrane, a physical barrier, a method involving addition of water or other substance, or high octane fuel may be in a more upper portion of the gasoline within the separator than low octane fuel or vice versa.

At 162, high octane fuel may be delivered to a high octane fuel tank. In some embodiments, the high octane portion of the fuel separator may have a first outlet. High octane fuel may, in some embodiments, be released from the separator in a gaseous form. In such an embodiment, high octane fuel may be condensed into liquid form in a condenser separate from the high octane fuel tank or within the high octane fuel tank.

In embodiments recirculating high octane fuel into an externally filled fuel tank, the high octane fuel tank may be the externally filled fuel tank. Low octane fuel, as determined by the separator, may be returned to an externally filled fuel tank via a return line. The cycle may repeat until the octane level in the externally filled fuel tank falls below the aforementioned threshold. If the octane level in the externally filled fuel tank falls below an octane threshold at 156, fuel separation may end. Separation may be reinitiated in response to an engine refueling event. Engine separation may further be initiated by an engine starting event and may be terminated by an engine off event.

Presiding octane level in an externally filled fuel tank may be determined, in some embodiments, via a knock sensor system when fuel from the externally filled tank is being used. In other embodiments an octane level may be inferred based on the amount of time separation has occurred, a volume of fuel through a separator or in a high octane fuel tank. Other embodiments may determine a presiding octane level using a sensor or method not otherwise disclosed herein.

At 164, low octane fuel may be returned to an externally filled fuel tank via a return line. In some embodiments, the high octane portion of the fuel separator may have a second outlet. Low octane fuel may, in some embodiments, be released from the separator in a liquid form and returned to the externally filled fuel tank. In such an embodiment, an externally filled fuel tank may effectively become a low octane fuel tank. The octane level of fuel within the externally filled fuel tank may be inversely proportional to the duration of fuel separation. The continued removal of high octane components from fuel of an externally filled fuel tank may cause the octane level of fuel to become increasingly low.

At 166 a desired torque output may be determined. A desired torque output may refer to an amount of torque desired from combustion within the engine as determined by a controller. An amount of torque desired may be a function of a number of operating conditions that may include engine load, engine speed, or acceleration being requested by an operator.

At 168 an octane level of fuel able to achieve the desired torque output may be determined. If a higher torque output is desired, a higher octane level of fuel injected into the engine may be desired.

In embodiments having an externally filled fuel tank receiving low octane fuel from a separator, the amount of high-octane-to-low-octane fuel ratio able to achieve a desired torque output may be dependent on the presiding octane level of the fuel within an externally filled fuel tank. At 170, an amount of high octane fuel used to dope fuel from an externally filled fuel tank may be a function of the octane level in the externally filled fuel tank and the octane level able to achieve the desired torque output determined at 168.

At 172 it may be determined if high octane fuel is desired. This may be determined within a control system and may be responsive to an engine knock sensor, an engine load, or an engine temperature for example. If high octane doping of fuel delivered to the engine from the externally filled fuel tank is desired, the amount of high octane fuel determined at 170 may be injected into a combustion chamber at 176. At 178 fuel from an externally filled fuel tank may be delivered to the combustion chamber. In other embodiments, high octane fuel may be injected into low octane fuel upstream of a combustion chamber, such as in a fuel rail or a fuel line. Other embodiments may inject fuel from an externally filled fuel tank using port injection and may inject fuel from a high octane fuel tank using direct injection. Method 150 may repeat throughout engine operation.

Figure 11:
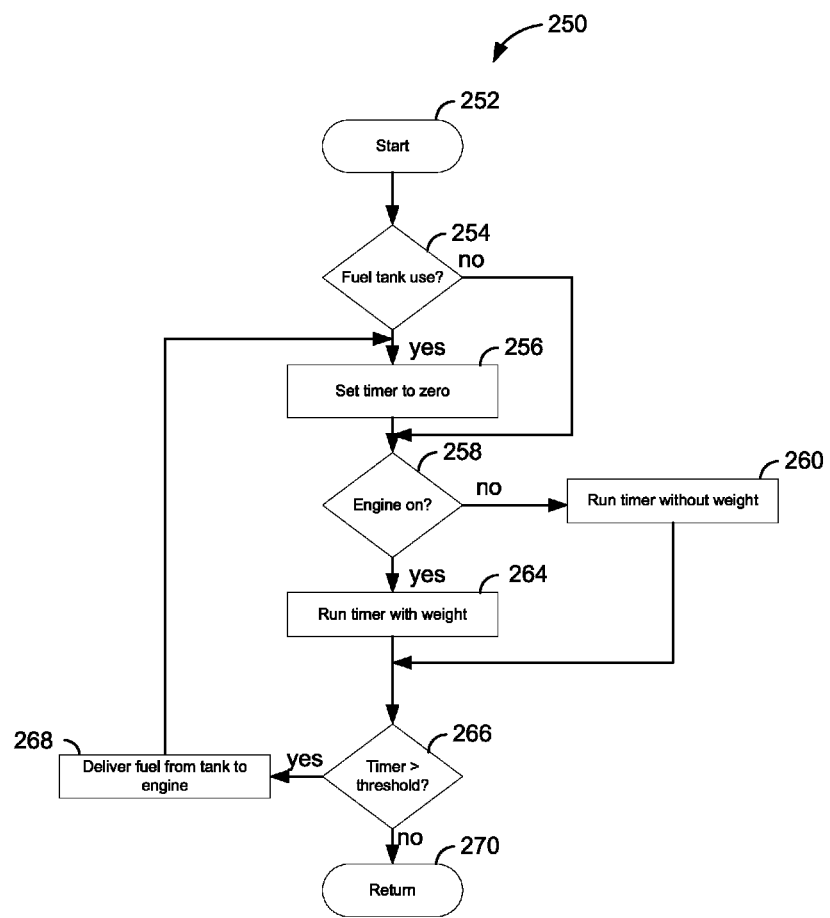

FIG. 11 shows a flowchart depicting method 250 in accordance with the present disclosure. Method 250 may be carried out by controller 12. Method 250 may be used in a configuration such as that depicted in FIGS. 1-4. Method 250 may be used in combination or may be a subroutine of methods that may or may not be otherwise indicated within this disclosure. For example, method 250 may be used in combination with method 500 and 600. Method 250 may be applied to an externally filled fuel tank, a low octane fuel tank, and/or a high octane fuel tank. Method 250 may be used to minimize fuel staleness by using fuel in a fuel tank after a period of inactivity.

Method 250 may begin at 252. At 254 it may determined if the fuel tank is being used, in other words, if fuel from that tank is being injected into the engine. In this method a fuel tank may be any of the fuel tanks of the fuel system. For example, if the method is applied to a high octane fuel tank then all references to the term fuel tank refer to the high octane fuel tank.

If fuel is being injected from the fuel tank a timer may be set to zero at 256. A timer may be within a control system and may be a counter that increases at given time intervals and thus corresponds to an amount of time elapsed since its most recent re-set or zero set.

At 258 it may be determined if the engine is on, engine on may refer to combustion occurring within the engine. If combustion is not occurring the engine may be considered off. If the engine is on at 258 the timer may be run with a weight. When the timer is run with a weight the counter may be run at a faster pace. For example, for a given amount of time, a counter being run with a weight may reach a higher value than a timer run without a weight. In other words, the time between counts may be smaller when a counter is run with a weight. If the engine is not on the method may continue to 260. At 260 the timer or counter may run without weight. In other words, for a given amount of time the counter without weight may reach a lower value than a counter with weight and the amount of time between subsequent counts may be greater when the timer is being run without weight. In some examples the weight may be one such that there is no difference in the frequency of counts when the weight is or is not applied. A weight greater than one may be advantageous for measurements used to determine staleness. Fuel may become stale at an increased rate when the engine is running than when the engine is not running. For example, lighter components of gasoline evaporate at a higher rate at high temperatures which may be caused by engine operation, thus during engine operation fuel may become stale from evaporation more quickly. The weight given to a timer may be proportional to the increased rate at which fuel becomes stale during engine operation than during engine off.

The value of the counter or timer may be compared to a threshold at 266. If the value is above a threshold method 250 may continue to 268. At 268 fuel from the tank may be delivered to the engine for combustion. In some embodiments fuel may be delivered to the engine continuously until the tank is empty. In other embodiments, an amount of fuel may be injected into the engine or fuel from the tank may be delivered to the engine for a predetermined amount of time. The method may then return to 256 where the timer may be set to zero. If the threshold is not met the method may repeat indefinitely or until a refueling event.

Figure 12:
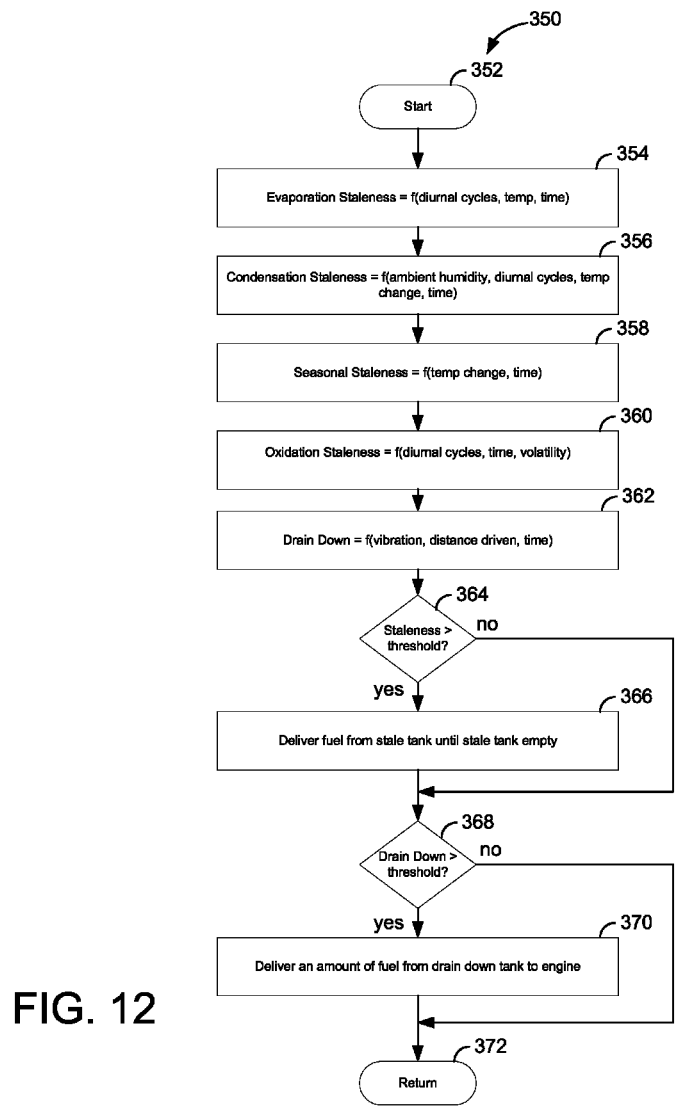

FIG. 12 shows a flowchart depicting method 350 in accordance with the present disclosure. Method 350 may be carried out by controller 12. Method 350 may be used in a configuration such as that depicted in FIGS. 1-4. Method 350 may be used in combination or may be a subroutine of methods that may or may not be otherwise indicated within this disclosure. For example, method 350 may be used in combination with method 500 and 600. Method 350 may refer to an externally filled fuel tank, a low octane fuel tank, and/or a high octane fuel tank. Method 350 may be used to minimize fuel staleness by monitoring the fuel staleness in each tank independently and injecting fuel from that fuel tank into the engine when fuel staleness is determined by a control system. The method may start at 352 and may be initiated by an engine refueling event or an engine starting event.

At 354, staleness from evaporation may be determined. In some embodiments, evaporation staleness may take a binary form (negative or affirmative value), for example if evaporation is above a threshold evaporation staleness is positive else it is negative. In other embodiments evaporation staleness may have a numeric value, for example fuel may be at 97% of accepted compound density.

Staleness from evaporation may refer to compounds within gasoline evaporating out of the fuel, particularly the lighter more volatile components. This may cause engine performance losses, hard starting, increased emissions, and fuel efficiency losses. Further, this may lower the octane rating of the fuel. Staleness from evaporation may be a function of temperature of the fuel throughout operation. For example, fuel may experience increased evaporation during higher temperatures. In an embodiment, a weighted counter may run continuously after a refueling event. The weight of the counter may be proportional to temperature. Thus the temperature used in the determination of evaporation staleness may be representative of the temperatures experienced by the fuel for the duration of its time in the fuel tank. Other embodiments may determine evaporation staleness based on the amount of time the fuel has remained in the fuel tank, or the amount of time or flow through an evaporative emissions system, or the number of diurnal cycles. Still further embodiments may directly determine evaporation staleness by monitoring the density of components within the fuel or within the air in the fuel tank.

At 356, staleness from condensation may be determined. In some embodiments, condensation staleness may take a binary form (negative or affirmative value), for example if water content is above a threshold condensation staleness may be positive, else it may be negative. In other embodiments condensation staleness may have a numeric value, for example fuel may be 12% water.

Staleness from condensation occurs when water contaminates fuel. Water contamination may cause fuel line freezing or air-fuel ratio errors or poor combustion stability or engine misfire. Water contamination occurs when water in the air condenses into the fuel. This occurs most frequently when temperatures fluctuate. For example, if temperatures cool, humidity within the air may condense within a fuel tank and mix with fuel. Water contamination may be determined in a controller and may be responsive to an amount of time fuel has remained in a tank by a method such as those mentioned above. Condensation staleness may further be responsive to the number of diurnal cycles the fuel has been through, or the number of seasonal changes that have lapsed while the fuel was in the fuel tank. The ambient humidity of air within the fuel tank, and the number of air changes due to diurnal cycles throughout the duration of the fuel being within the fuel tank may be monitored and may be used, in part, to determine the condensation staleness of fuel.

Seasonal staleness or seasonal inappropriateness may be determined at 358. In some embodiments, seasonal staleness may take a binary form (negative or affirmative value), for example if more than six months have elapsed since a refueling event, seasonal staleness may be positive else it may be negative. Gasoline distributed for consumers may have a summer grade chemical composition or a winter grade chemical composition. Appropriate grade fuel may help to improve engine starting during cold winter months and decrease emissions or avoid vapor lock during warm summer months. Seasonal staleness may be determined or inferred based on the time elapsed since a last refueling event, a change in ambient temperature, and/or the chemical composition of fuel such as an amount of butane per unit volume. Note seasonal staleness may not imply fuel degradation.

Oxidation staleness may be determined at 360. Oxidation staleness may refer to oxygen reacting with the hydrocarbons within the fuel to form other compounds. These compounds may dramatically change the chemical composition of the fuel, lowering the fuel volatility or energy density. Severe oxidation may cause the fuel to coagulate or form deposits. Coagulated fuel or deposits may clog fuel lines, fuel filter, fuel injectors, or other components in the fuel system. Oxidation staleness may be determined in response to fuel volatility or the number of air changes due to diurnal cycles or an amount of time fuel has been in the fuel tank.

Drain down may be determined at 362. When fuel sits for an amount of time, fuel may drain from the lines back into the tank or other fuel system components, and air bubbles may form in the fuel lines due to imperfect sealing at injectors or fuel system connections, or due to permeation through fuel system components. Air bubbles in fuel lines may result in injection of less fuel than desired, causing degraded emissions or engine misfire. Drain down may be determined as a function of an amount of vibration the fuel has experienced since the fuel lines have been purged via injection of fuel in the relevant fuel tank. This vibration may itself be inferred within a control system from an amount of time or miles driven since a fuel line purge, or it may be sensed by accelerometers. In one embodiment, accelerometer signals normally used for vehicle stability control or other purposes may be used in the drain down calculation. In another embodiment, vehicle location information may be used in conjunction with data about road roughness for the drain down calculation.

At 364 it may be determined if fuel staleness is above a threshold. Fuel staleness may be a function of evaporation staleness, condensation staleness, seasonal staleness, oxidation staleness, or some combination thereof. In some embodiments, each staleness may be compared to a threshold or binary comparator, if one or more of the staleness indicators are above the threshold or have an affirmative binary value, the threshold may be met at 364. Staleness may refer to evaporation staleness, condensation staleness, oxidation staleness, seasonal appropriateness, or fuel drain down.

If the threshold is met at 364, fuel from the stale fuel tank may be delivered to the engine. Here delivery from the stale fuel tank may refer to increasing a rate at which the fuel from the stale tank is used or injecting fuel from the fuel stale tank until the tank is empty. In some embodiments, fuel may be purged or an indicator set. In still further examples, a rate at which fuel is injected from a stale tank may increase gradually with fuel staleness. In some examples fuel separation may be suspended until the stale fuel has been purged from the tank.

If the fuel is not stale at 364, the method may go to 368. At 368 it may be determined if drain down is above a numeric threshold or indicated. If drain down is found to be above a threshold, an amount of fuel from the drain down tank may be delivered to the engine. Drain down may be rectified by purging the line of air bubbles by injecting enough fuel into the engine so that air bubbles or purged, or until all fuel within the fuel line or fuel rail is replaced by fuel within the tank. Thus, at 370 a sufficient amount of fuel from the drain down tank may be delivered to the engine. The method may repeat at given intervals of time or distance traveled. In some embodiments, method 350 may be a subroutine of method 250. For example, if the timer is above a threshold at 266, method 350 may be initiated.

In still further embodiments, fuel from each fuel tank may be injected intermittently into the engine. For example, fuel from each fuel tank may be injected after an engine starting event or at predetermined intervals. Thus fuel in an underused tank is regularly injected so that fuel in an underused tank does not sit indefinitely.

In other embodiments an engine may have a staleness prevention mode that may be initiated periodically, in response to an engine starting event, or in response to a refueling event. In a staleness prevention mode, equal amounts of fuel from each of the tanks coupled to the engine, or amounts proportional to the tank sizes, may be injected into the engine for combustion. In some embodiments this may occur over a predetermined amount of time or until a predetermined amount of fuel is injected into the engine. In other embodiments staleness prevention mode may be initiated immediately or soon following an engine starting event.

For example, if a system having a high octane and low octane fuel tank enters a staleness prevention mode, equal amounts of high octane fuel and low octane fuel may be delivered to the engine for combustion. Or the amounts of high octane fuel and low octane fuel may be proportional to the size of the high and low octane fuel tanks respectively. This may continue for a predetermined amount of time or until a predetermined amount of fuel is injected, staleness prevention mode may then end and normal operation and fuel injection ensue. In still further embodiments of a staleness prevention mode, an amount of fuel in a high octane fuel tank may be compared to a level of fuel in a low octane fuel tank, if the high-octane-to-low-octane fuel level ratio is above a first threshold, high octane fuel may be injected at a high rate until the fuel level falls below a second threshold. Similarly, if the high octane to low octane fuel level is below a third threshold, low octane fuel may be injected at a high rate until the fuel level reaches a fourth threshold.

Figure 13:
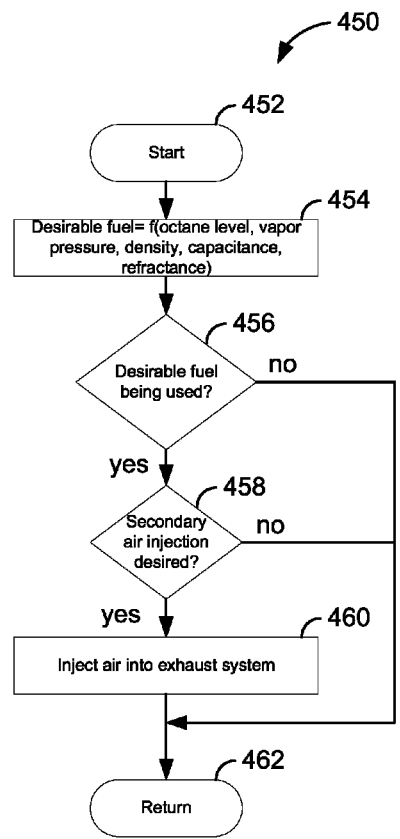
FIG. 13-FIG. 15 depict example operating methods for a fuel system with fuel separation and secondary air injection.

FIG. 13 shows a flowchart depicting method 450 in accordance with the present disclosure. Method 450 may be carried out by controller 12. Method 450 may be used in a configuration such as that depicted in FIGS. 1 and 4. Method 450 may be used in combination or may be a subroutine of methods that may or may not be otherwise indicated within this disclosure. For example, method 450 may be used in combination with method 500 and 600.

Method 450 may be used in a system equipped with secondary air injection and fuel separation. Secondary air injection may deliver atmospheric air to an exhaust manifold. This may allow faster catalyst light-off and may lower emissions. A fuel system may split fuel into a low octane portion and a high octane portion. In some embodiments, low octane fuel may be recirculated back into an externally filled fuel tank and high octane fuel may be stored in a secondary tank or vice versa. In these embodiments, both an externally filled fuel tank and a secondary fuel tank may be individually coupled to the engine. In other embodiments, both the high octane fuel and the low octane fuel may be stored separately in two secondary fuel tanks. In some embodiments the two fuel lines may merge upstream of direct injectors or port injectors so that low octane fuel and high octane fuel are combined upstream of the injector. In other embodiments, the low octane fuel tank and high octane fuel tank may be fluidically coupled to independent direct and/or port injectors such that high octane fuel and low octane fuel are combined after injection. In embodiments having two secondary (high and low octane) fuel tanks and an externally filled fuel tank, each of the three fuel tanks may be independently coupled to direct injectors and/or port injectors. One or more of the fuels may merge in a fuel line upstream of an injector.

Method 450 may begin at 452 and may be initiated by an engine starting event. At 454 it may be determined which of the fuels is most desirable for secondary air injection. In other words, it may be determined which of the fuels contains hydrocarbons most likely to oxidize during secondary air injection. This may be inferred based on an octane level of the fuels, for example, low octane fuel may be assumed more desirable for secondary air injection. Other embodiments may determine which fuel is desirable in response to an amount of time separation has occurred and may further infer the octane level of fuel based on the duration of separation. Further embodiments may measure octane level directly or via a knock feedback sensor. Other embodiments may directly measure the relevant properties of a fuel which may be correlated with the fuels oxidation properties; this may include vapor pressure, density, capacitance, molecular weight, and refractance. It some embodiments it may be determined that no fuel is desirable for oxidation. This may result after a fuel refill event before fuel is adequately separated. In some embodiments, the desirable fuel for secondary air injection as determined above may define an engine condition. For example, in a first condition, the fuel determined to be desirable for combustion during secondary air injection may be the high octane fuel. In a second condition, the fuel determined to be desirable for combustion during secondary air injection may be the low octane fuel.

At 456 it may be determined if the desirable fuel is currently being injected into engine for combustion. In other words, if the engine is in a first condition it may be determined if high octane fuel is currently being injected for combustion. In a second condition it may be determined if low octane fuel is being injected for combustion.

If the desirable fuel is being used, it may be determined if secondary air injection is desired at 458. This may be in response to a cold start condition when catalyst warm-up is desired, and other conditions are favorable for use of secondary air.

If secondary air injection is desired at 458, secondary air injection may be initiated at 460 by injecting air into the exhaust system or exhaust manifold. Within the exhaust system or manifold hydrocarbons may interact with injected oxygen for continued combustion and reduced emissions. In some embodiments additional heat may be delivered to the exhaust system for increased secondary combustion. At 462 the method may repeat. The method may repeat in rapid succession or at predetermined intervals.

Figure 14:
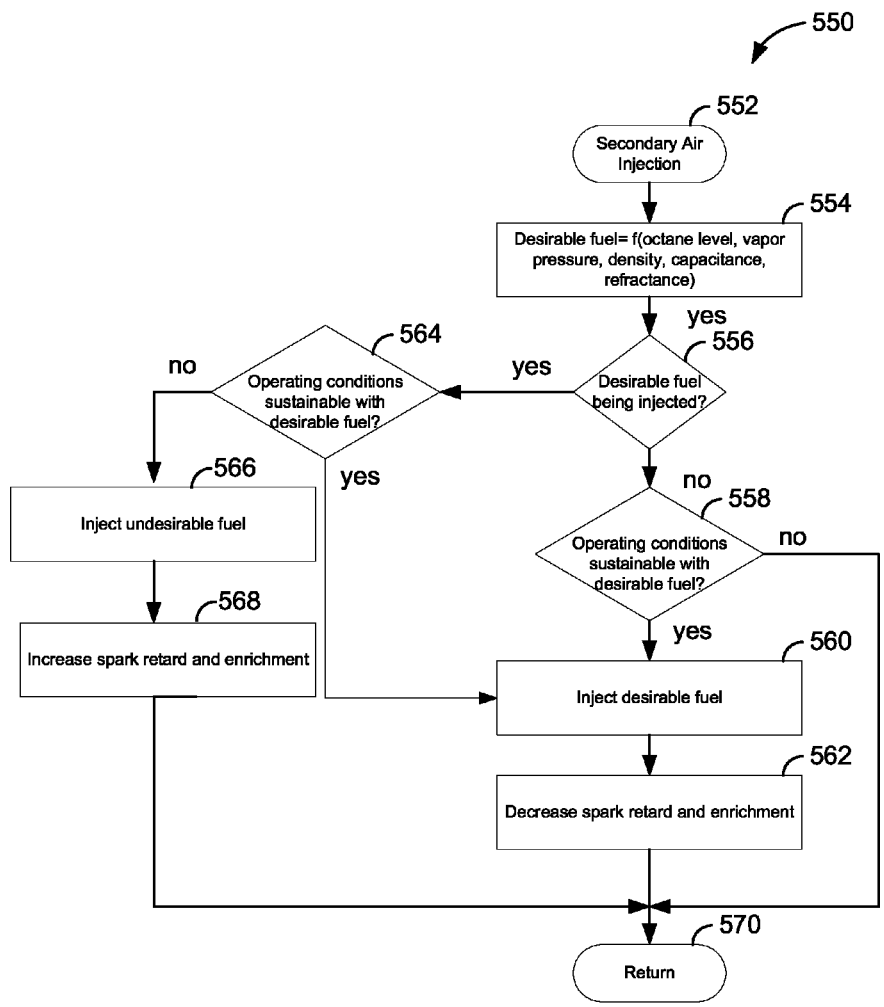

FIG. 14 shows a flowchart depicting method 550 in accordance with the present disclosure. Method 550 may be carried out by controller 12. Method 550 may be used in a configuration such as that depicted in FIGS. 1 and 4. Method 550 may be used in combination or may be a subroutine of methods that may or may not be otherwise indicated within this disclosure. For example, method 550 may be used in combination with method 500 and 600.

Method 550 may be used in a system equipped with secondary air injection and fuel separation. Secondary air injection may deliver atmospheric air to an exhaust manifold. This may allow faster catalyst lightoff and may lower emissions. A fuel system may split fuel into a low octane portion and a high octane portion. In some embodiments, low octane fuel may be recirculated back into an externally filled fuel tank and high octane fuel may be stored in a secondary tank or vice versa. In these embodiments, both an externally filled fuel tank and a secondary fuel tank may be individually coupled to the engine. In other embodiments, both the high octane fuel and the low octane fuel are stored separately in two secondary fuel tanks. In some embodiments the two fuel lines may merge upstream of direct injectors or port injectors so that low octane fuel and high octane fuel are combined upstream of the injector(s). In other embodiments, the low octane fuel tank and high octane fuel tank may be fluidically coupled to independent direct and/or port injectors such that high octane fuel and low octane fuel are combined after injection. In embodiments having two secondary (high and low octane) fuel tanks and an externally filled fuel tank, each of the three fuel tanks may be independently fluidically coupled to direct injectors and/or port injectors. One or more of the fuels may merge in a fuel line upstream of an injector.

The method may begin at 552 and may be initiated by the initiation of secondary air injection. At 554 it may be determined which of the fuels is most desirable for combustion during secondary air injection. In other words, it may be determined which of the fuels contains hydrocarbons most likely to oxidize during secondary air injection. This may be inferred based on an octane level of the fuels, for example, low octane fuel may be assumed more desirable for secondary air injection. Other embodiments may determine which fuel is desirable in response to an amount of time separation has occurred and may further infer the octane level of fuel based on the duration of separation. Further embodiments may measure octane level directly or using a knock feedback sensor. Other embodiments may directly measure the relevant properties of a fuel which may be correlated with the fuels oxidation properties; this may include vapor pressure, density, capacitance, and refractance. It some embodiments it may be determined that no fuel is desirable for oxidation. This may result after a fuel refill event before fuel is adequately separated.

In some embodiments, the type of fuel found to be most desirable may define an engine condition. In a first condition, high octane fuel may be determined more desirable for combustion during secondary air injection. In a second condition low octane fuel may be found to be more desirable for combustion during secondary air injection.

At 556 it may be determined if the desirable fuel is currently being injected into the engine for combustion. For example, it may be determined if, in a first condition, high octane fuel is being injected into the engine or, in a second condition, low octane fuel is being injected into the engine. It may be determined if the presiding operating conditions are sustainable with the desired fuel at 558. This may include the amount of desirable fuel available, presiding engine load, speed, temperature, knock suppression, or emission production.

If the desirable fuel is not being injected but the current operating conditions may be sustained using the desirable fuel, the desirable fuel may be injected into the engine for combustion at 560. In alternate embodiments, the percentage of desirable fuel to undesirable fuel injected may increase. The desirable fuel may be more readily oxidized than the currently injected fuel. The desirable fuel may thus demand less spark retard for acceptable oxidation and increased exhaust heat.

In a conditional example, if the engine is found to be in a first condition and high octane fuel is not being injected into the engine, it may be determined at 558 if operating conditions are sustainable with the injection of high octane fuel. If sustainability with high octane fuel is determined, high octane fuel may be delivered to the engine and used for combustion and a first operating routine may be initiated. If it is determined that operating conditions cannot be sustained with the high octane fuel, low octane fuel may continue to be injected into the engine and a second routine may be initiated.

Further, if the engine is found to be in a second condition and low octane fuel is not being injected into the engine, it may be determined at 558 if operating conditions are sustainable with the injection of low octane fuel. If sustainability with low octane fuel is determined, low octane fuel may be delivered to the engine and used for combustion and a first operating routine may be initiated. If it is determined that operating conditions cannot be sustained with the low octane fuel, high octane fuel may continue to be injected into the engine and a second routine may be initiated.

Thus, the step 562 may be referred to as a first routine. In a first routine, the amount of spark retard may be decreased. In some embodiments fuel enrichment, that may have been increased to achieve efficient secondary combustion, may be decreased at 562 or in a first routine. An amount of air delivered to the exhaust system for secondary air injection may also be decreased. In embodiments having additional heat source applied to the exhaust system, additional heat delivered to the exhaust system may be decreased or suspended at 562 or in a first routine. Further, if a presiding AFR has been decreased to promote secondary combustion, it may be increased to a level determined by the operating conditions. Returning to 558, if the operating conditions are not sustainable with the desirable fuel the method may end at 570.

If it is determined at 556 that the desirable fuel is being injected the method may continue to 564. At 564 it may be determined if the presiding operating conditions are sustainable with continued use of the desirable fuel. This may include the amount of desirable fuel available, presiding engine load, speed, temperature, knock suppression, or emission production. If operation may be sustained with the desirable fuel, the method may proceed to 560 as previously described. If the operating conditions cannot be maintained with the desirable fuel, the undesirable fuel may be injected into the engine for combustion at 566 and a second routine may be initiated. In alternate embodiments, the percentage of undesirable fuel to desirable fuel injected may increase. If undesirable fuel is injected at 566, in a second routine, spark retard may be initiated or increased. Increased spark retard may increase the temperature of exhaust gas to allow for secondary air injection of the less readily oxidized fuel. An amount of enrichment and/or an amount of air delivered to the exhaust system for secondary air injection may also be increased in a second routine. In embodiments having additional heat source applied to the exhaust system, additional heat delivered to the exhaust system may be increased or initiated at 568.

Method 550 may be initiated in response to initiation of secondary air injection. Secondary air injection may be initiated in response to methods that may or may not be otherwise disclosed herein. Method 550 may continue while secondary air injection continues and may be suspended when secondary air injection stops.

Figure 15:
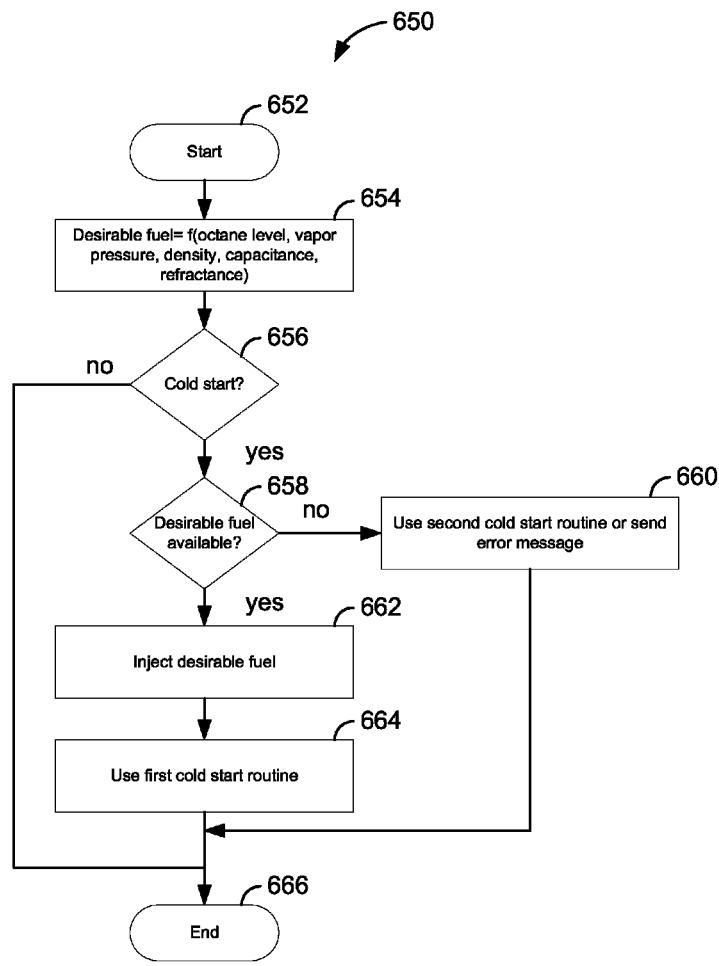

FIG. 15 shows a flowchart depicting method 650 in accordance with the present disclosure. Method 650 may be carried out by controller 12. Method 650 may be used in a configuration such as that depicted in FIGS. 1 and 4. Method 650 may be used in combination or may be a subroutine of methods that may or may not be otherwise indicated within this disclosure. For example, method 650 may be used in combination with method 500 and 600.

Method 650 may be used in a system equipped with secondary air injection and fuel separation. Secondary air injection may deliver atmospheric air to an exhaust manifold. This may allow faster catalyst lightoff and may lower emissions. A fuel system may split fuel into a low octane portion and a high octane portion. In some embodiments, low octane fuel may be recirculated back into an externally filled fuel tank and high octane fuel may be stored in a secondary tank or vice versa. In these embodiments, both an externally filled fuel tank and a secondary fuel tank may be individually coupled to the engine. In other embodiments, both the high octane fuel and the low octane fuel are stored separately in two secondary fuel tanks. In some embodiments the two fuel lines may merge upstream of direct injectors or port injectors so that low octane fuel and high octane fuel are combined upstream of the injector. In other embodiments, the low octane fuel tank and high octane fuel tank may be fluidically coupled to independent direct injectors and/or port injectors such that high octane fuel and low octane fuel are combined after injection. In embodiments having two secondary (high and low octane) fuel tanks and an externally filled fuel tank, each of the three fuel tanks may be independently fluidically coupled to direct injectors and/or port injectors. One or more of the fuels may merge in a fuel line upstream of an injector.

The method may begin at 652 and may be initiated by an engine starting event. At 654 it may be determined which of the fuels is most desirable for combustion during secondary air injection. In other words, it may be determined which of the fuels contains hydrocarbons most likely to oxidize during secondary air injection. In a first condition, the high octane fuel may be the desirable fuel. In a second condition, the low octane fuel may be the desirable fuel. A desirable fuel may be inferred based on an octane level of the fuels, for example, low octane fuel may be assumed more desirable for secondary air injection. Other embodiments may determine which fuel is desirable in response to an amount of time separation has occurred and may further infer the octane level of fuel based on the duration of separation. Further embodiments may measure octane level directly or using a knock feedback sensor. Other embodiments may directly measure the relevant properties of a fuel which may be correlated with the fuels oxidation properties; this may include vapor pressure, density, capacitance, and refractance. In some embodiments it may be determined that no fuel is desirable for oxidation. This may occur after a fuel refill event when fuel is not adequately separated.

At 656 it may be determined if the engine is operating in a cold start condition. In other embodiments this may be responsive to the temperature of the engine or catalyst, or the atmospheric temperature, it may be further responsive to the amount of time the engine is operating. If a cold start is determined at 656, it may be determined at 658 if the desirable fuel, as determined at 654, is available for injection. This may be determined by a sensor within a fuel tank that may measure the fuel level and fuel properties. If the desirable fuel is available the desirable fuel may be injected into the engine for combustion at 662. Injection of the desirable fuel may continue for a predetermined amount of time, for the duration of secondary air injection, or it may continue while an engine or catalyst temperature is measured or inferred to be under a threshold. At 664 a first cold start routine may be initiated. The first routine may include a first degree of spark retard, a first AFR, and/or a first amount of secondary air injection.

For example, in a first condition, if high octane fuel is injected into the engine at 662 the first routine may be initiated at 664. In a second condition, if low octane fuel is injected into the engine at 662, the first routine may also be initiated at 664.

If at 658 it is determined that the desirable fuel is not available, a different fuel may be injected into the engine and a second cold start routine initiated at 660. The second routine at 660 may include a second degree of spark retard, a second AFR, and/or a second amount of secondary air injection. The second degree of spark retard may be greater than the first degree of spark retard and the second AFR may be lower than the first AFR. The method may end at 666. In other embodiments the method may repeat at given intervals or in rapid succession.

In other words, in a first condition, if low octane fuel is injected into the engine, a second routine may be initiated. In a second condition, if high octane fuel is being injected into an engine, a second routine may also be initiated.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   delivering fuel to an engine from a first fuel tank under some conditions, and delivering fuel to said engine from a second fuel tank under other conditions;
   monitoring a staleness of fuel within the first fuel tank and the second fuel tank;
   delivering fuel from the first fuel tank to the engine in response to the staleness of fuel of the first fuel tank; and
   delivering fuel from a second fuel tank to the engine in response the staleness of fuel of the second fuel tank.

2. The engine method of claim 1, wherein staleness includes condensation staleness, evaporation staleness, seasonal staleness, oxidation staleness, drain down of fuel lines, or some combination thereof.

3. The engine method of claim 1, wherein the staleness is based on an amount of time elapsed since fuel has been added to a fuel tank via a fuel refill event or fuel separation.

4. The engine method of claim 1, wherein the staleness is based on air bubbles within a fuel line.

5. The engine method of claim 1, further comprising delivering an amount of fuel from the first fuel tank and the second fuel tank to the engine immediately after an engine refuel event or an engine starting event and subsequently delivering fuel from the first fuel tank and the second fuel tank in response to operating conditions.

6. The engine method of claim 1, further comprising inferring staleness in response to a temperature within the engine or fuel system, an ambient humidity, a number of diurnal cycles elapsed since fuel was added to the fuel tank, an oxygen density within fuel, a volatility of fuel, an amount of vibration experienced by a fuel system, a distance driven since a fuel was added to the fuel tank, or some combination thereof.

7. The engine method of claim 1, further comprising, when fuel is not found to be stale, increasing an amount of fuel from the first fuel tank and decreasing an amount of fuel from the second fuel tank delivered to the engine in response to an engine temperature being above a threshold, engine load being above a threshold, engine speed being below a threshold, an indication of engine vibration, an indication of engine knock, an engine torque demand being above a threshold, an engine power demand being above a threshold, an intake manifold pressure being above a threshold, or some combination thereof.

8. The engine method of claim 7, further comprising, when fuel is not stale, decreasing the amount of fuel from the first tank delivered to the engine and increasing the amount of fuel from the second tank delivered to the engine in response to an engine temperature being below a threshold, engine load being below a threshold, engine speed being above a threshold, a cessation of engine vibration, a cessation of engine knock, an engine torque demand being below a threshold, an engine power demand being below a threshold, an intake manifold pressure being below a threshold or some combination thereof.

9. An engine method, comprising:
   delivering fuel to a first fuel tank in response to an octane level of fuel being above a threshold;
   delivering fuel to a second fuel tank in response to the octane level of fuel being below a threshold;
   increasing the octane level of fuel delivered to the engine in response to fuel staleness in the first fuel tank; and
   decreasing the octane level of fuel delivered to the engine in response to fuel staleness in the second fuel tank.

10. The engine method of claim 9, further comprising increasing a volume of fuel delivered from the first fuel tank in response to fuel staleness in the first fuel tank and increasing a volume of fuel delivered from the second fuel tank in response to staleness in the second fuel tank.

11. The engine method of claim 9, further comprising increasing a volume of fuel delivered from the first fuel tank in response to output from a knock feedback sensor.

12. The engine method of claim 9, further comprising direct injecting fuel from the first fuel tank and port injecting fuel from the second fuel tank.

13. The engine method of claim 9, further comprising determining staleness as a function of condensation staleness, evaporation staleness, oxidation staleness, seasonal appropriateness, fuel line drain down, or some combination thereof.

14. The engine method of claim 9, further comprising inferring staleness in response to a temperature within the engine or fuel system, an ambient humidity, a number of diurnal cycles elapsed since fuel was added to the fuel tank, an oxygen density within fuel, a volatility of fuel, an amount of vibration experienced by a fuel system, a distance driven since a fuel was added to the fuel tank, or some combination thereof.

\* \* \* \* \*